US012678741B2

(12) United States Patent (10) Patent No.: US 12,678,741 B2
Stainer et al. (45) Date of Patent: Jul. 14, 2026

(54) MICROPOROUS MEMBRANES, UNDERLAYMENT, ROOFING, FLASHING, WRAP, AND METHODS FOR MAKING AND USING THE SAME

(71) Applicant: Daramic, LLC, Charlotte, NC (US)

(72) Inventors: Matthew Stainer, Owensboro, KY (US); Eric H. Miller, Philpot, KY (US); Matt J. Wolski, Charlotte, NC (US); Tyler Munhollon, Owensboro, KY (US); Daniel R. Alexander, Matthews, NC (US); Gary L. Fulkerson, Owensboro, KY (US)

(73) Assignee: Daramic, LLC, Charlotte, NC (US)

( * ) Notice: Subject to any disclaimer, the term of this patent is extended or adjusted under 35 U.S.C. 154(b) by 286 days.

(21) Appl. No.: 18/234,183

(22) Filed: Aug. 15, 2023

(65) Prior Publication Data

US 2023/0381720 A1 Nov. 30, 2023

Related U.S. Application Data

(62) Division of application No. 16/754,149, filed as application No. PCT/US2018/054909 on Oct. 9, 2018, now Pat. No. 11,766,642.

(Continued)

(51) Int. Cl.
*B01D 69/14* (2006.01)
*B01D 67/00* (2006.01)
(Continued)

(52) U.S. Cl.
CPC ......... *B01D 69/148* (2013.01); *B01D 67/002* (2013.01); *B01D 67/003* (2013.01);
(Continued)

(58) Field of Classification Search
CPC .......... E04B 1/625; E04B 1/78; E04B 1/8409; E04B 2001/7691; E04D 12/002; B29K 2509/02
See application file for complete search history.

(56) References Cited

U.S. PATENT DOCUMENTS 3,351,495 A 11/1967 Larsen et al.
4,789,578 A * 12/1988 Twyford ................. E02D 31/02
428/110

(Continued)

FOREIGN PATENT DOCUMENTS

EP 1497364 B1 * 10/2011 .......... H01M 50/494
JP 2000046283 2/2000
(Continued)

*Primary Examiner* — Brent W Herring
(74) *Attorney, Agent, or Firm* — J. Clinton Wimbish; Maynard Nexsen PC

(57) ABSTRACT

In at least one embodiment, a microporous membrane having a moderate to high water vapor permeability and high liquid water penetration resistance is disclosed. The microporous membrane may be used in building applications, including as or as part of a building wrap, a rain screen, a roofing underlayment, a flashing, a sound proofing material, or an insulation material. The microporous membrane may include at least one thermoplastic polymer, at least one filler, and at least one processing oil. The microporous membrane may be flat or may have ribs. The microporous membrane may include at least one scrim component. A method for forming the microporous membrane is also disclosed.

26 Claims, 15 Drawing Sheets

Underlayment 100

110
Slip Resistant Top Layer

120
UV and
Antioxidant
Protection
Bond Layer

130
Very High Strength
Woven Layer

140
Reflective Barrier

Related U.S. Application Data

(60) Provisional application No. 62/677,335, filed on May 29, 2018, provisional application No. 62/570,823, filed on Oct. 11, 2017.

(51) Int. Cl.

| | |
|---|---|
| *B01D 69/02* | (2006.01) |
| *B01D 71/02* | (2006.01) |
| *B01D 71/26* | (2006.01) |
| *B01D 71/30* | (2006.01) |
| *B29C 48/00* | (2019.01) |
| *E04B 1/62* | (2006.01) |
| *E04B 1/78* | (2006.01) |
| *E04B 1/84* | (2006.01) |
| *E04D 12/00* | (2006.01) |
| *B29K 509/02* | (2006.01) |
| *E04B 1/76* | (2006.01) |

(52) U.S. Cl.

CPC ......... *B01D 67/0079* (2013.01); *B01D 69/02* (2013.01); *B01D 71/021* (2013.01); *B01D 71/024* (2013.01); *B01D 71/261* (2022.08); *B01D 71/262* (2022.08); *B01D 71/301* (2022.08); *B29C 48/022* (2019.02); *E04B 1/625* (2013.01); *E04B 1/78* (2013.01); *E04B 1/8409* (2013.01); *E04D 12/002* (2013.01); *B01D 2323/21* (2013.01); *B01D 2325/08* (2013.01); *B01D 2325/20* (2013.01); *B01D 2325/34* (2013.01); *B29C 48/0011* (2019.02); *B29C 48/002* (2019.02); *B29K 2509/02* (2013.01); *E04B 2001/7691* (2013.01)

(56) References Cited

U.S. PATENT DOCUMENTS

| | | | | |
|---|---|---|---|---|
| 4,861,644 A * | 8/1989 | Young | ................... | B41M 1/30 |
| | | | | 427/256 |
| 5,296,287 A | 3/1994 | Ribbans | | |
| 5,481,838 A * | 1/1996 | Fishel | ................... | B32B 27/12 |
| | | | | 442/392 |
| 5,687,517 A * | 11/1997 | Wiercinski | .............. | B32B 27/08 |
| | | | | 52/783.17 |
| 5,826,390 A * | 10/1998 | Sacks | ........................ | E04B 1/62 |
| | | | | 52/302.1 |
| 5,948,557 A * | 9/1999 | Ondeck | ..................... | C08J 5/18 |
| | | | | 521/64 |
| 5,948,707 A * | 9/1999 | Crawley | .............. | A41D 31/102 |
| | | | | 442/76 |
| 6,205,730 B1 * | 3/2001 | Hasan | ..................... | E04D 5/145 |
| | | | | 411/164 |
| 6,331,345 B1 * | 12/2001 | Kauschke | .............. | B32B 27/12 |
| | | | | 428/156 |
| 6,355,333 B1 * | 3/2002 | Waggoner | ................. | E04B 1/62 |
| | | | | 52/630 |
| 6,509,084 B2 * | 1/2003 | Sturtevant | .............. | B29C 51/02 |
| | | | | 428/141 |
| 6,550,212 B2 * | 4/2003 | Lubker, II | .............. | D06N 3/125 |
| | | | | 52/302.1 |
| 7,445,735 B2 * | 11/2008 | Miller | ................. | B29C 48/0011 |
| | | | | 264/344 |
| 7,459,180 B2 * | 12/2008 | Hamdar | ................ | E04D 12/002 |
| | | | | 428/40.1 |
| 7,470,094 B2 * | 12/2008 | Heathcott | .......... | E02D 29/0241 |
| | | | | 405/129.95 |
| 7,520,097 B2 * | 4/2009 | Aalbers | ................... | B32B 21/10 |
| | | | | 52/302.1 |
| 7,607,270 B2 * | 10/2009 | Ehrman | .................... | E04B 1/70 |
| | | | | 52/302.1 |
| 11,725,381 B2 * | 8/2023 | Ehrman | .............. | E04F 13/0864 |
| | | | | 52/302.3 |
| 11,745,480 B2 * | 9/2023 | Bachon | .................. | B32B 27/08 |
| | | | | 428/195.1 |
| 2003/0215594 A1 * | 11/2003 | Hamdar | ................. | B41M 3/006 |
| | | | | 428/40.1 |
| 2006/0141223 A1 * | 6/2006 | Oles | ..................... | D06M 23/10 |
| | | | | 442/79 |
| 2006/0155031 A1 * | 7/2006 | Wiercinski | .............. | C08L 29/04 |
| | | | | 524/451 |
| 2006/0194495 A1 * | 8/2006 | Lubker, II | .............. | D06N 3/125 |
| | | | | 52/302.1 |
| 2008/0152867 A1 * | 6/2008 | Di Pede | .................. | B32B 5/024 |
| | | | | 427/256 |
| 2008/0176022 A1 * | 7/2008 | Payne | ..................... | D04H 11/00 |
| | | | | 427/372.2 |
| 2008/0271400 A1 * | 11/2008 | Raidt | ...................... | E04D 3/357 |
| | | | | 52/783.17 |
| 2010/0215924 A1 * | 8/2010 | Di Pede | .................. | B32B 27/12 |
| | | | | 428/196 |
| 2010/0255739 A1 | 10/2010 | Black et al. | | |
| 2010/0287865 A1 | 11/2010 | Hatzinikolas | | |
| 2011/0262699 A1 * | 10/2011 | Yializis | ................. | B32B 29/002 |
| | | | | 442/379 |
| 2011/0277393 A1 * | 11/2011 | Hohmann, Jr. | ......... | B32B 33/00 |
| | | | | 156/154 |
| 2015/0298427 A1 * | 10/2015 | Kronenberg | .......... | B32B 27/065 |
| | | | | 428/319.7 |
| 2016/0024782 A1 * | 1/2016 | Bess | ...................... | C08K 3/016 |
| | | | | 428/41.5 |
| 2021/0123185 A1 * | 4/2021 | Mason | .................. | D06M 23/16 |
| 2021/0316541 A1 * | 10/2021 | Bachon | .................. | B32B 27/08 |
| 2021/0402372 A1 * | 12/2021 | Bergman | ................. | B01J 20/24 |
| 2024/0097277 A1 * | 3/2024 | Miller | ................. | H01M 50/494 |

FOREIGN PATENT DOCUMENTS

| | | |
|---|---|---|
| WO | WO9420995 | 9/1994 |
| WO | WO2015183354 | 12/2015 |

* cited by examiner

Underlayment 100

110
Slip Resistant Top Layer

120
UV and
Antioxidant
Protection
Bond Layer

130
Very High Strength
Woven Layer

140
Reflective Barrier

SUBSTRATE          SLICKER          WATER          SIDING/
                   RAINSCREEN       RESISTIVE      CLADDING
                                    BARRIER

1½″ Roofing Nail

Front

Back with Scrim

Front

Back with Scrim

Front

Back

MICROPOROUS MEMBRANES, UNDERLAYMENT, ROOFING, FLASHING, WRAP, AND METHODS FOR MAKING AND USING THE SAME

RELATED APPLICATIONS

This application is a Divisional application to U.S. application Ser. No. 16/754,149, filed Apr. 7, 2020, which claims priority to PCT Application No. PCT/US2018/054909, filed Oct. 9, 2018, which claims priority to U.S. Provisional Application Nos. 62/677,335, filed May 29, 2018 and 62/570,823, filed Oct. 11, 2017, which are incorporated herein by reference in their entireties.

FIELD

In accordance with at least selected embodiments, this application or invention is directed to new or improved microporous membranes, products using the same, and/or methods for making and/or using the same. In accordance with at least certain embodiments, the new microporous membranes have high water vapor transmission through the membrane, while simultaneously having high liquid water penetration resistance. These new microporous membranes have many applications, including in the construction industry as a roofing, roofing material, roofing underlayment, roofing component, building wrap, building component, rain screen, flashing, flashing component, sound proofing material, insulation material, flooring, flooring underlayment, flooring component, carpet underlayment, carpet component, and/or the like. The microporous membrane may include at least one scrim component, coating, surface treatment, surface material, ribs, pattern, printing, embossment, adhesive, and/or the like.

BACKGROUND

Materials having high water vapor transmission through the membrane, while simultaneously having high liquid water penetration resistance, are highly desirable for use in building construction and the like. They provide a physical barrier between the building and the environment. They prevent water from entering the building, while at the same time allowing water vapor to escape. Trapped water vapor, which will likely eventually cool and become liquid water, can lead to issues such as wood rotting or mold. Exemplary uses of these materials include uses in housing wraps, roofing underlayments, building wrap, flashing, rain screens, sound proofing material, insulation material, and/or the like. Known materials include reinforced, non-reinforced, densified or not densified wovens or non-wovens. Coatings and/or surface treatments are typically added to the wovens or non-wovens to improve properties, including liquid water penetration resistance. Standard roofing underlayments are tar paper or asphalt saturated roof felt used between the roof deck and the shingles.

One example of a laminate roofing underlayment 100 is shown in FIG. 1. This material is a laminate material, wherein the very high-strength woven material provides the desired properties of high water vapor transmission through the membrane, while simultaneously having high liquid water penetration resistance. Additional layers are included in the roofing underlayment laminate material shown in FIG. 1 to provide additional desirable properties such as a slip-resistant top layer, which improves the safety of the material when it is being installed on an inclined surface (i.e., a surface other than a horizontal), and a UV and antioxidant protection layer to improve the durability of the film. Additional layers may be added to provide soundproofing, insulation, flame retardance, and/or the like, and combinations thereof. For example, the underlayment 100 in FIG. 1 comprises a slip-resistant top layer 110, a UV& antioxidant protection bond layer 120, a very high-strength woven layer 130, and a reflective barrier 140. As the laminate structure gets more complex, costs goes up, and properties such as water vapor transmission may go down.

Building wrap, such as that used for houses, may have a similar structure to a roofing underlayment, but the same properties are not necessarily required. For example, a building wrap likely does not need to have a liquid water penetration resistance as high as that of a roofing underlayment. One example of a building wrap is available from Benjamin Obdyke, Hydrogap® Drainable Housewrap is shown in FIGS. 2 and 3. This building wrap is a tri-layer drainable building wrap including two non-woven layers surrounding a microporous film to protect it. As shown in FIG. 3, the spacers in this tri-layer building wrap are affixed to, not integral with, tri-layer structure.

Referring now to FIGS. 4 and 5, an exemplary rain screen is the Slicker® rain screen available from Benjamin Obdyke. However due to its open structure, it is not water resistant on its own. As shown in FIG. 5, it must be combined with a water resistive barrier in order to exhibit water resistance.

An exemplary flashing materials may be made of sheet metal, plastic, or a combination of materials, (e.g., metal and plastic), but there are current concerns with trapping water, corrosion and/or UV damage for these materials.

Accordingly, there exists a need for new and improved materials for use in building wraps, rain screens, roofing underlayments, sound proofing materials, flashing, insulation materials, and/or the like. In accordance with the thinking of the present invention or inventors, simplified materials for use in building wraps, rain screens, roofing underlayments, sound proofing materials, flashing, insulation materials, and/or the like are desired, materials that do not need to be combined with other materials to perform the desired functions are preferred, and integral rather than multilayer structures are also preferred.

SUMMARY

In accordance with at least selected embodiments, this application or invention may address the above needs, problems and/or issues, and/or may provide new and/or improved materials for use in building wraps, rain screens, roofing underlayments, roofing, sound proofing materials, flashing, insulation materials, and/or the like, and/or is directed to new or improved microporous membranes, products using the same, and methods for making and using the same, new microporous membranes having high water vapor transmission through the membrane, while simultaneously having high liquid water penetration resistance, and/or new microporous membranes having use as or are adapted for applications, including in the construction industry as a roofing, roofing material, roofing underlayment, building wrap, rain screen, flashing, sound proofing material, insulation material, and/or the like. The microporous membrane may include at least one scrim component.

In accordance with at least selected embodiments, aspects, or objects, this application or invention provides, and/or is directed to new or improved microporous membranes, products using the same, and/or methods for making and/or using the same. In accordance with at least certain embodiments, the new microporous membranes have high water vapor transmission through the membrane, while simultaneously having high liquid water penetration resistance. These new microporous membranes have many applications, including in the construction industry as a roofing, roofing material, roofing underlayment, roofing component, building wrap, building component, rain screen, flashing, flashing component, sound proofing material, insulation material, flooring, flooring underlayment, flooring component, carpet underlayment, carpet component, and/or the like. The microporous membrane may include at least one scrim component, coating, surface treatment, surface material, ribs, pattern, printing, embossment, adhesive, and/or the like.

In at least one embodiment, a microporous membrane having a moderate to high water vapor permeability and high liquid water penetration resistance is disclosed. The microporous membrane may be used in building applications, including as or as part of a building wrap, a rain screen, a roofing underlayment, a flashing, a sound proofing material, or an insulation material. The microporous membrane may include at least one thermoplastic polymer, at least one filler, and at least one processing oil. The microporous membrane may be flat or may have ribs. In some preferred embodiments, the microporous membrane comprises ribs on at least one side thereof. In some embodiments, the microporous membrane comprises ribs on both sides thereof. Adding ribs may make the product comprising the microporous membrane drainable; ribs may improve traction, e.g., between a roofing underlayment comprising the membrane and a roof deck; ribs may improve walkability, e.g., provide a slip-resistant surface for a roofing underlayment comprising the membrane; and ribs may also provide an air gap, which allows for air circulation, breathability, and drying in the product comprising the membrane, e.g., a rain screen. In such a product, a board or similar is applied on top to create the gaps. Two sides of the gaps are provided by the ribs, one side of the gaps are provided by the backweb of the membrane, and a third side of the gaps are provided by a board or similar. A ribbed microporous membrane as described herein is an integral structure that provides these functions. These functions may have been provided previously by adding different layers or coatings. Here, ribs are part of the membrane and there is no need to add additional sheets, layers, etc. to get the same effect. In some embodiments, the microporous membrane may include an additional component such as at least one scrim component. A method for forming the microporous membrane is also disclosed.

In one possibly preferred aspect or embodiment, a microporous membrane that has high water vapor transmission, while at the same time having high liquid water resistance and/or high hydrophobicity, is described herein. The microporous membrane, in some embodiments, exhibits a water vapor permeance value from approximately 5 perms to approximately 60 perms when measured according to ASTM E96 "water method" or equivalents, and in other embodiments, the water vapor permeance value is from about 30 perms to about 50 perms when measured according to ASTM E96 "water method" or equivalents. The water penetration resistance of the microporous membrane is from about 150 cm to about 350 cm according to AATC 127 or equivalents in some embodiments.

In some embodiments, the microporous membrane includes at least one thermoplastic polymer, at least one filler, at least one processing oil, and optionally one or more additional components for improving the properties of the membrane.

The thermoplastic polymer may be an acid resistant thermoplastic polymer. In some embodiments, the thermoplastic polymer may be at least one thermoplastic polymer selected from the group consisting of polyvinyl chloride, polyethylene, and polypropylene. The polyethylene may be an ultrahigh molecular weight polyethylene having a weight average molecular weight of at least $5 \times 10^5$, or in some embodiments, at least $5 \times 10^6$.

In some embodiments, the filler includes at least one organic or inorganic filler that has a surface wettability with water that is less than that of silica, and preferably less than that of polyethylene. In some embodiments, filler includes at least one organic or inorganic filler that has a low surface wettability with water (i.e., exhibits a contact angle greater than or equal to approximately 90°, but less than approximately 180° degrees. In some embodiments, the at least one filler is selected from the group consisting of: carbon black, talc, calcium carbonate, kaolin, diatomaceous earth, clay, wollastonite, mica, aluminum oxide ($Al_2O_3$), boehmite (Al(O)OH), zirconium dioxide ($ZrO_2$), titanium dioxide ($TiO_2$), barium sulfate ($BaSO_4$), barium titanium oxide ($BaTiO_3$), aluminum nitride, silicon nitride, calcium fluoride, barium fluoride, zeolite, apatite, mullite, spinel, olivine, mica, tin dioxide ($SnO_2$), indium tin oxide, oxides of transition metals and mixtures thereof. In some embodiments the at least one filler is present in an amount from about 5 wt. % to about 60 wt. % based on the total weight of the microporous membrane.

In some embodiments, the filler includes carbon black, in some embodiments, in an amount from about 5 wt. % to about 60 wt. %, about 5 wt. % to about 30 wt. %, or from about 5 wt. % to about 20 wt. % based on the total weight of the microporous membrane. In some embodiments, the filler is a mixture of carbon black and silica, and carbon black is present, in some embodiments, in an amount from about 5 wt. % to about 30 wt. %, or from about 5 wt. % to about 20 wt. % based on the total weight of the microporous membrane.

The processing oil is preferably an extractable processing oil, and in some embodiments may be a mineral oil. The extractable processing oil may be present in an amount of from about 0.1 wt. % to about 35 wt. %, from about 0.1 wt. % to about 20 wt. %, or from about 0.1 wt. % to about 5 wt. % relative to the total weight of the microporous membrane. An extractable or removable processing oil, plasticizer and/or solvent may be used.

In some embodiments, the microporous membrane may have ribs, such as solid ribs, discrete broken ribs, continuous ribs, discontinuous ribs, angled ribs, linear ribs, longitudinal ribs extending substantially in a machine direction of said porous membrane, lateral ribs extending substantially in a cross-machine direction of said porous membrane, transverse ribs extending substantially in said cross-machine direction of the separator, serrations or serrated ribs, battlements or battlemented ribs, curved or sinusoidal ribs, disposed in a solid or broken zig-zag-like fashion, grooves, channels, textured areas, embossments, dimples, porous, non-porous, mini ribs, cross-mini ribs, and combinations thereof. The ribs may be on one or both surfaces of the microporous membrane and may have a height (or depth) from about 0.1 mm to about 12 mm as measured from the surface of the microporous film to the tip of the ribs.

In another aspect or embodiment, a roofing, roofing material, or roofing underlayment includes the microporous membrane described herein. The roofing underlayment may be self-adhesive or not self-adhesive. Self-adhesive may mean that the material itself is adhesive or that an adhesive has been added to one or more surfaces of the material to make it adhesive.

In another aspect, a roofing underlayment system includes the roofing underlayment, which includes the microporous membrane described herein is disclosed. The roofing underlayment system may, in some embodiments, include the microporous membrane described herein attached to a roof deck. The roof deck may be made of plywood or particle board, and the microporous membrane described herein may be attached or mounted to the roof deck using an adhesive, including the adhesive of the self-adhesive roofing underlayment, screws, nails, staples, other fasteners, and combinations thereof. In some embodiments, the roofing underlayment itself, i.e., without the addition of an adhesive, may be tacky and can be adhered to the roof deck by applying pressure. In some embodiments, the roofing underlayment itself, i.e., without the addition of an adhesive, may be adhered to the roof deck by applying heat and/or pressure to bond the roofing underlayment and the roof deck.

In another aspect, a building wrap includes the microporous membrane described herein is disclosed. In some embodiments, the building wrap is a drainable building wrap. Sometimes, the drainage efficiency of the building wrap is at least 80% when tested according to ASTM E2273 or equivalents. The building wrap may be self-adhesive or not self-adhesive. Self-adhesive may mean that a material itself is adhesive or that an adhesive has been added to one or more surfaces of the material to make it adhesive.

In another aspect, a building wrap system is disclosed, which includes a drainable or non-drainable building wrap as described herein attached or mounted to an exterior wall sheathing. In some embodiments, the exterior wall sheathing is made of wood or plywood, and the building wrap, in some embodiments, is attached or mounted to the exterior wall sheathing using an adhesive, including the adhesive of the self-adhesive building wrap, screws, nails, staples, other fasteners, and combinations thereof. In some embodiments, the building wrap itself, i.e., without the addition of an adhesive, is tacky and can be adhered to an exterior wall sheathing by applying pressure. In some embodiments, the building wrap itself, i.e., without the addition of an adhesive, may be adhered to an exterior wall sheathing by applying heat to bond the roofing underlayment and the roof deck. In such embodiments, the roofing underlayment itself acts as a heat-sensitive adhesive.

In another aspect, a sound proofing material includes the microporous membrane described herein is disclosed. The sound proofing material may be self-adhesive or not self-adhesive. Self-adhesive may mean that the material itself is adhesive or that a layer of adhesive has been added to the material to make it adhesive.

In yet another aspect, a sound proofing system including a laminate wall or floor is disclosed. The laminate wall or floor may, in some embodiments, include a sound proofing material that includes the microporous membrane described herein.

In another aspect, an insulating material includes the microporous membrane described herein is disclosed. The insulating material may be self-adhesive or not self-adhesive.

In another aspect an insulating system includes the insulating material that includes the microporous membrane described herein between at least two wall studs, rafters, or joists is disclosed.

In another aspect, a rain screen includes the microporous membrane disclosed herein is described. The microporous membrane of the rain screen includes, in some embodiments, ribs having a rib height of at least about 10 mm.

In another aspect, a composite building material comprising a building component affixed to the microporous membrane is described herein. When the building component is shingles it may be made from at least one material selected from the group consisting of wood, slate, stone, flagstone, clay, metal, plastic, copper, rubber, asbestos, shake, a solar panel, and composite materials such as fibre cement and asphalt. When the building component is siding it may be made from at least one material selected from the group consisting of stone, metal, wood, shake, stucco, plastic, brick, and composite materials such as fibre cement. When the building component is flooring, the flooring may be made from at least one material selected from the group consisting of stone, would, ceramic, plastic, metal, glass, rubber, carpet, brick, and composite materials. These composite building materials may be used in the systems, e.g., the insulating system, building wrap system, etc., described hereinabove. Affixed, as used herein, means that the building component and the microporous membrane are in some way connected to each other, e.g., via a physical or chemical bond. In some embodiments, the composite building material may be formed by co-extruding the material used to make the microporous membrane and the material used to form the building component. For example, the material used to make the building component may be asphalt. In some embodiments, the extruded material used to form the building component may be patterned or embossed. For example, extruded asphalt may be embossed to make it look like shingles.

In another aspect, a method for forming a microporous membrane that has high water vapor transmission, while at the same time having high liquid water resistance, is described herein. The method produces, in some embodiments, a microporous membrane that exhibits a water vapor permeance value from about 5 perms to about 60 perms when measured according to ASTM E96 "water method" or equivalents, and in other embodiments, the water vapor permeance value is from about 30 perms to about 50 perms when measured according to ASTM E96 "water method" or equivalents. In some embodiments, the water resistance of the microporous membrane when measured according to is from about 150 cm to about 350 cm according to AATC 127 or equivalents.

The method includes, in some embodiments, extruding a mixture including at least one thermoplastic polymer, at least one filler, at least one processing oil, and optionally, one or more additional components to form a precursor microporous film. In some embodiments, the method further includes extracting at least some of the processing oil from the precursor microporous film. In some embodiments, a solvent, which may be an oil and in some embodiments a mineral oil, is used to extract the processing oil. In some embodiments up to 99.99% of the processing oil is extracted using a solvent.

The thermoplastic polymer, filler, and processing oil used in the method are, in some embodiments, as described herein. In some embodiments, the processing oil may be present in the extruded mixture in an amount of from approximately 10 wt. % to approximately 90 wt. % relative to the total weight of the extruded mixture, and then, in some embodiments, at least some of the processing oil is extracted from the precursor microporous film. In some embodiments, the amount of filler, additional components, or thermoplastic polymer may be lower in the extruded mixture than in the microporous membrane because the amount of processing oil is higher.

In some embodiments, the method further includes forming ribs, such as solid ribs, discrete broken ribs, continuous ribs, discontinuous ribs, angled ribs, linear ribs, longitudinal ribs extending substantially in a machine direction of said porous membrane, lateral ribs extending substantially in a cross-machine direction of said porous membrane, transverse ribs extending substantially in said cross-machine direction of the separator, serrations or serrated ribs, battlements or battlemented ribs, curved or sinusoidal ribs, disposed in a solid or broken zig-zag-like fashion, grooves, channels, textured areas, embossments, dimples, porous, non-porous, mini ribs, cross-mini ribs, and combinations thereof. The ribs may be on one or both surfaces of the microporous membrane and may have a height (or depth) from about mm to about 12 mm as measured from the surface of the microporous film to the tip of the ribs. The ribs may be formed, in some embodiments, by at least one of patterning, printing, calendering, or embossing. The ribs may be linear or non-linear, solid or broken, and/or form ordered or random patterns.

DETAILED DESCRIPTION

Figure 1:
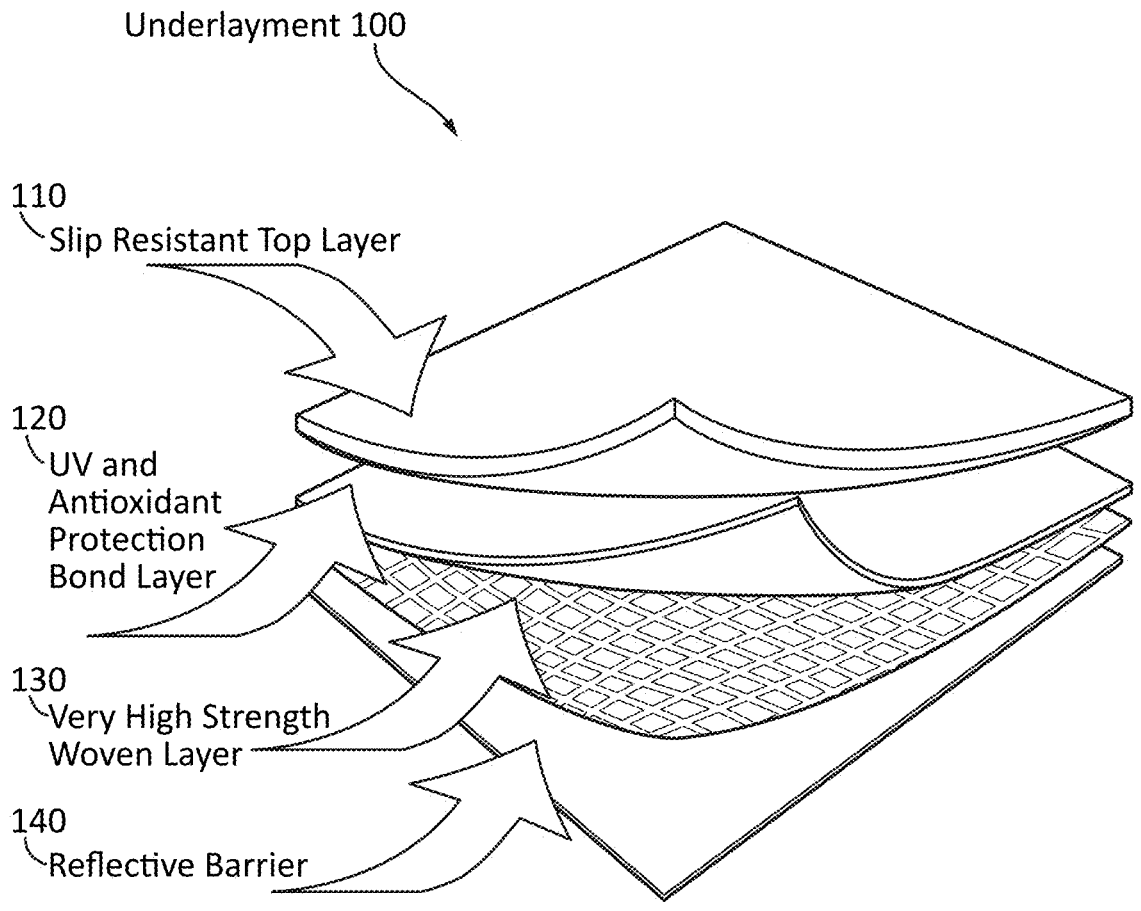
FIG. 1 depicts an existing roofing underlayment article.
Figure 2:
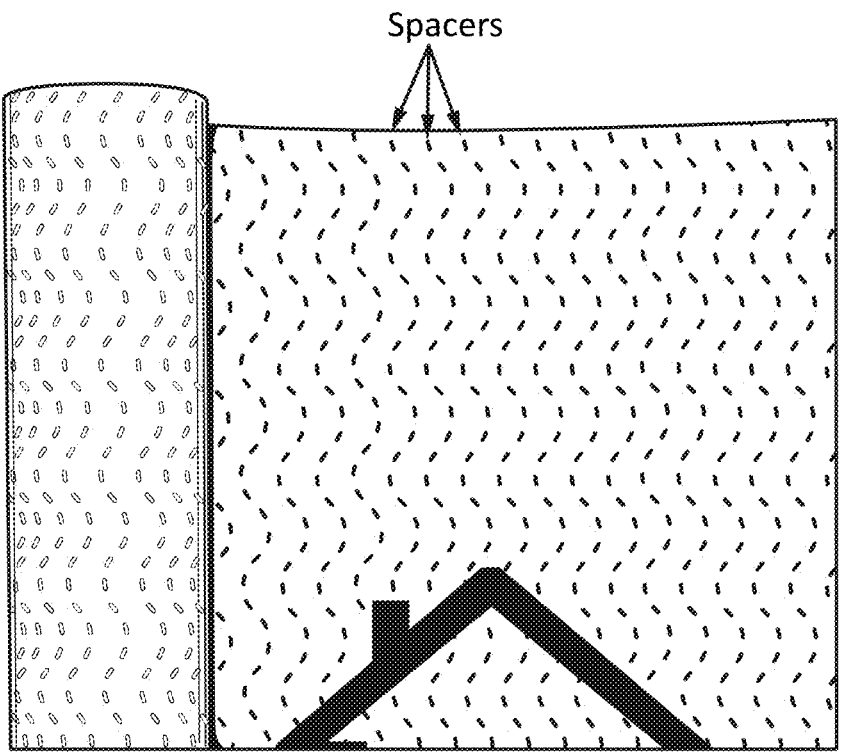
FIGS. 2 and 3 depict an existing building wrap article.
Figure 3:
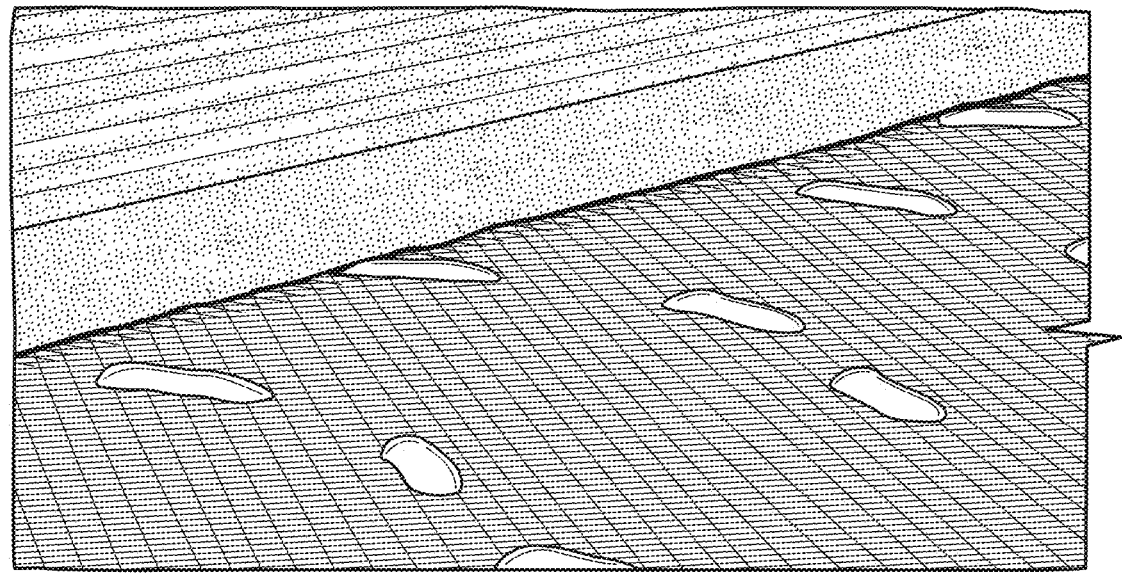

In accordance with at least selected embodiments, new and/or improved materials for use in building wraps, rain screens, roofing underlayments, roofing, sound proofing materials, flashing, insulation materials, and/or the like, and/or new or improved microporous membranes, products using the same, and methods for making and using the same, new microporous membranes having high water vapor transmission through the membrane, while simultaneously having high liquid water penetration resistance, and/or new microporous membranes having use as or are adapted for applications, including in the construction industry as a roofing, roofing material, roofing underlayment, building wrap, rain screen, flashing, sound proofing material, insulation material, and/or the like are disclosed. The microporous membrane may include at least one scrim component.

In accordance with at least certain embodiments, disclosed herein is a microporous membrane having moderate to high water vapor permeability and high liquid water resistance. High water vapor permeability refers to the membrane's ability to allow water vapor (i.e., water in a gaseous state) to pass through the film. Liquid resistance refers to the membrane's ability to resist the passage of liquid water through the membrane. Microporous membrane's having these properties would be useful in a variety of known and unknown applications where passage of water vapor across the membrane is desirable, but passage of liquid water is not. A few exemplary envisioned applications include the following: use in roofing underlayment, use in drainable and non-drainable house wrap, use in rain screens, use in insulation material, use in sound proofing material, and use as a performance fabric (for tents, exercise clothing, tarps, etc.).

Microporous Membrane

A microporous membrane as described herein is one having pores where the average pore size is preferably between 0.1 and 5.0 microns, between 0.1 and 4.0 microns, between 0.1 and 3.0 microns, between 0.1 and 2.0 microns, or between 0.1 and 1.0 microns. In some embodiments, the pores are between 0.1 and 0.9 microns, between 0.1 and 0.8 microns, between 0.1 and 0.7 microns, between 0.1 and 0.6 microns, between 0.1 and 0.5 microns, between 0.1 and 0.4 microns, between 0.1 and 0.3 microns, or between 0.1 and 0.2 microns.

The possibly preferred microporous membrane described herein has moderate to high water vapor permeability and high liquid water resistance.

Water vapor permeability of the microporous membrane described herein may be quantified by calculating the moisture vapor permeance of the film. The moisture vapor permeance is calculated according ASTM standard E96 "water method," and the unit for moisture vapor permanence is "perms." High water vapor permeance corresponds to high water vapor permeability. The microporous membranes described herein exhibit moisture vapor permeance of 5 to 70 perms, preferably 8 to perms, more preferably 20 to 70 perms, even more preferably 15 to 70 perms or to 70 perms, even more preferably 40 to 70 perms, and most preferably 50 to 70 perms when measured according to ASTM E96 "water method."

Water resistance of the microporous membrane described herein may be quantified by measuring the bulk water hold out of the microporous membrane. Bulk water hold out is calculated according to AATCC-127 or equivalents. AATCC 127 Hydrostatic Pressure Test measures the resistance of a fabric to the penetration of water under hydrostatic pressure. The microporous membrane described herein has a bulk water resistance of greater than approximately 150 cm, preferably greater than approximately 200 cm, and the value may be as high as approximately 350 cm. Without wishing to be bound by theory, it is believed that the hydrophobicity (lower wettability with water) of the microporous membrane surface is at least partially responsible for its high liquid water resistance.

In some exemplary embodiments, the microporous membrane has a moderate to high water vapor permeability and high liquid water penetration resistance. In select embodiments, the microporous membrane may additionally have a low wettability with water of the microporous membrane (i.e., it exhibits a contact angle greater than or equal to 90° but less than 180° with water). Wettability may be measured according to ASTM D7334-08(2013) or equivalents.

In some preferred embodiments, the microporous membrane may have an air permeance, when measured according to ASTM E2178 or equivalents, not exceeding approximately 0.01 L/s·m², approximately 0.015 L/s·m², approximately L/s·m², approximately 0.025 L/s·m², approximately 0.03 L/s·m², or approximately 0.05 L/s·m² at 75 Pa.

Figure 6A:
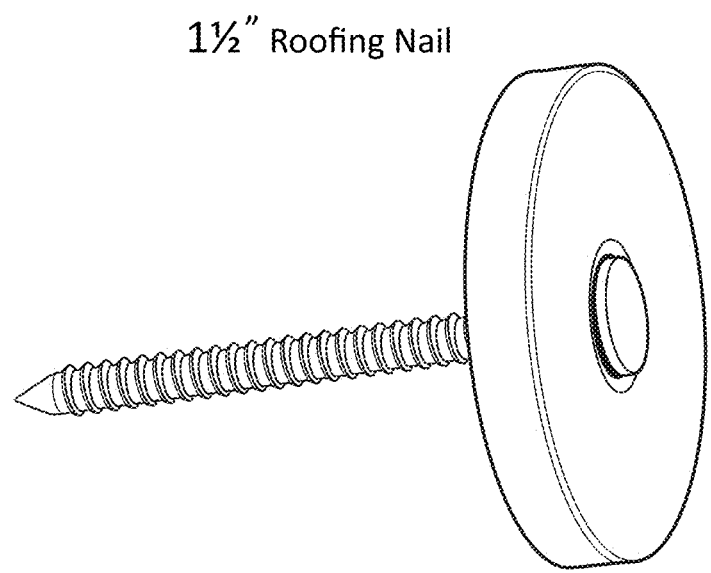
FIGS. 6A, 6B, and 6C show a roofing nail piercing an embodiment of the present invention under a 12.5 cm water head.
Figure 6B:
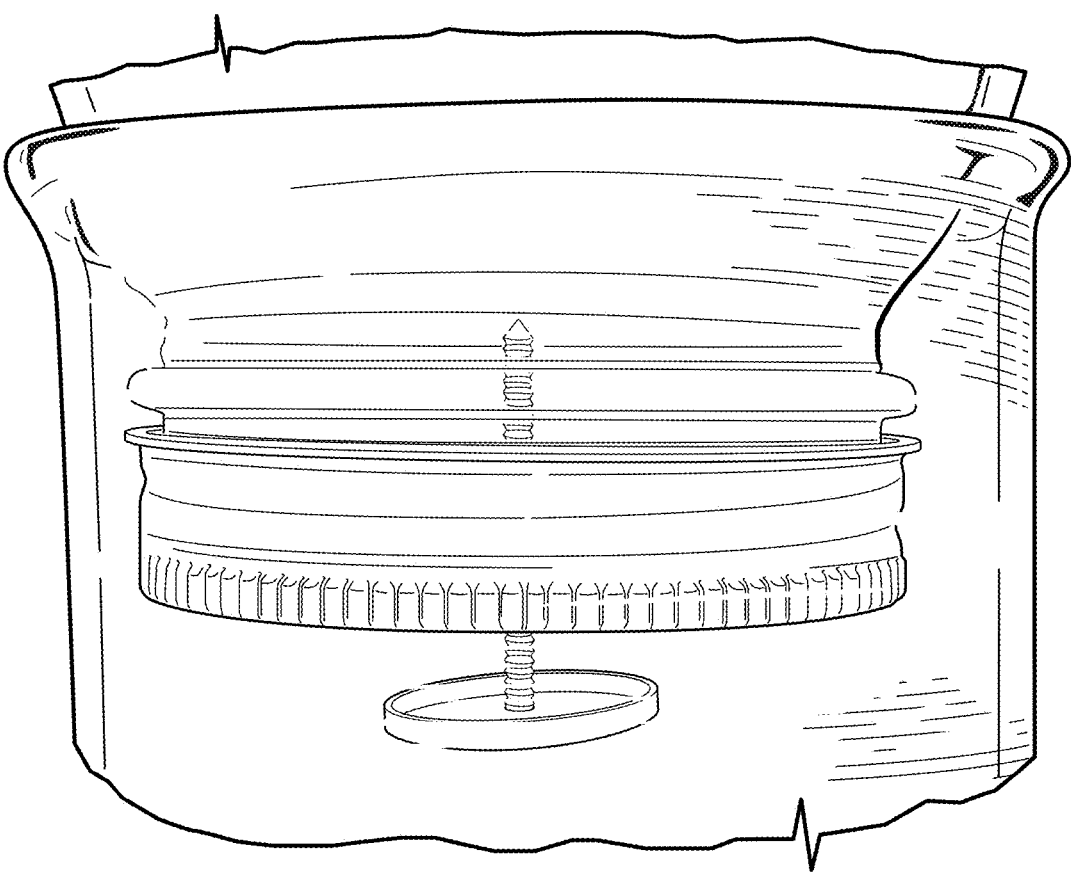
Figure 6C:
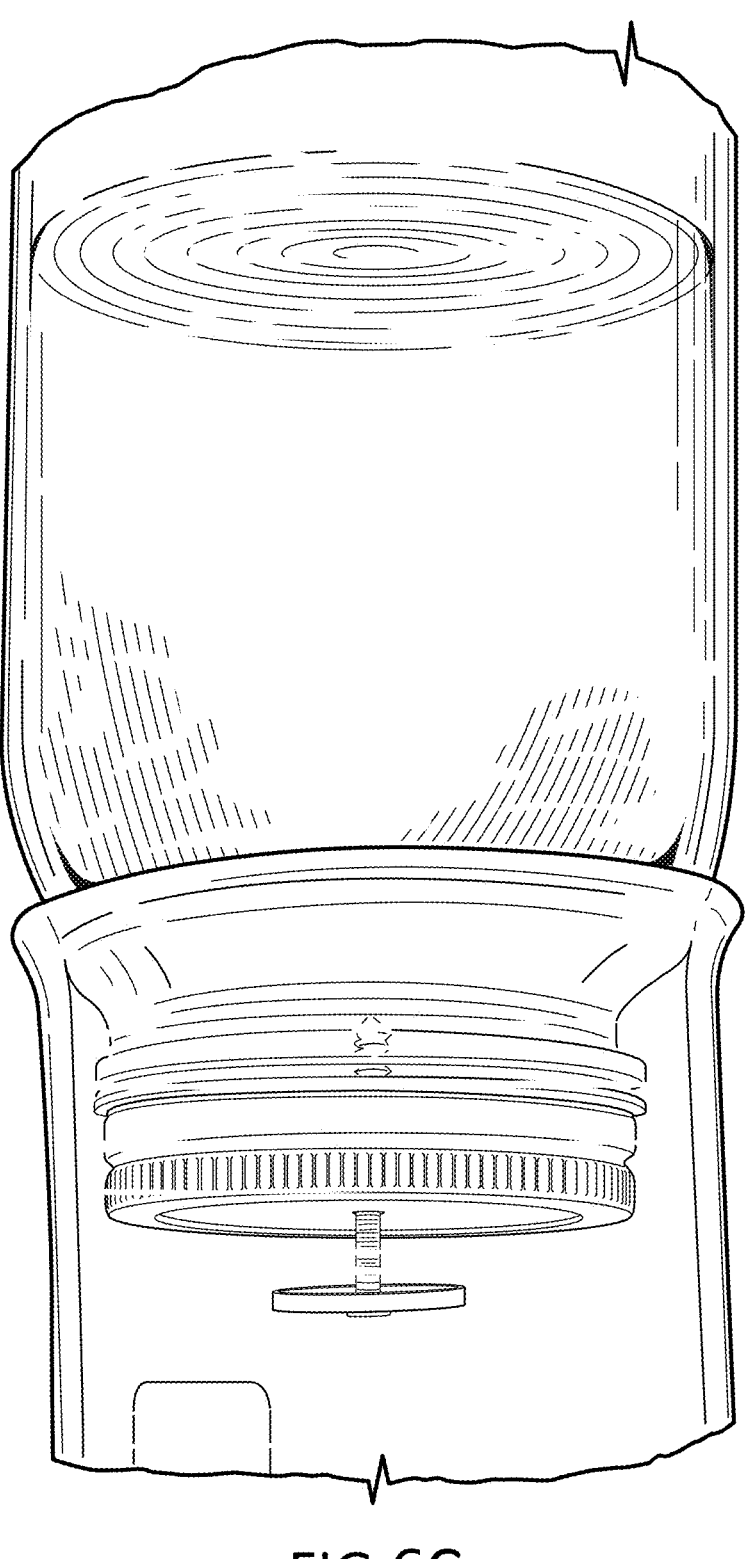

Some exemplary embodiments of the microporous membrane may pass a mason jar test for water intrusion and/or transmission. In this test, a microporous membrane is made to cover the opening of an inverted mason jar with a 12.5 cm or greater water pressure head above the membrane. To pass, no leaking should be observed. Referring now to FIGS. 6A-6C, an exemplary inventive membrane is punctured with a roofing nail (minimum 12 gauge). As shown in FIGS. 6B and 6C, the membrane is then subjected to the mason jar test with no water leaking observed. Without wishing to be bound by theory, the inventors reason that the microporous membrane does not leak even when punctured by a nail because the material is believed to be elastomeric or self-sealing and capable of sealing any opening between the membrane and the nail.

Physical Description

Figure 7:
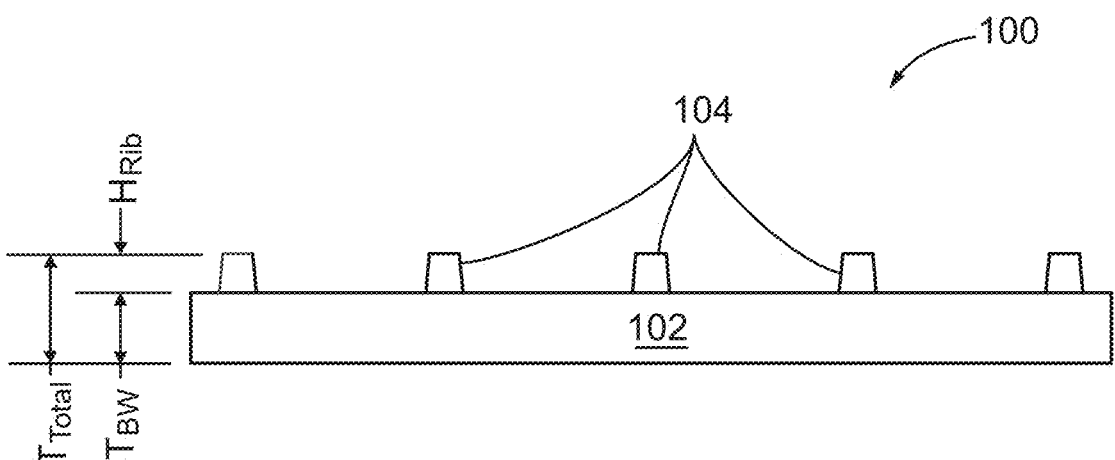
FIG. 7 is a schematic of an inventive embodiment with ribs.

With reference now to FIG. 7, an exemplary inventive microporous membrane 100 is schematically shown having a backweb 102 and optional ribs 104. The membrane has an associated backweb thickness $T_{BW}$, rib height $H_{Rib}$, and total thickness $T_{Total}$. In some embodiments, the microporous film is a single layer, bi-layer, or multilayer structure. In preferred embodiments, it is a single layer extruded or co-extruded layer.

Select embodiments of the microporous membrane 100 may be flat or have optional ribs 104 on one or both sides or surfaces thereof. In one exemplary embodiment, the microporous membrane 100 has a flat backweb 102 with ribs 104 on one surface (as shown) or ribs on both surfaces of the flat backweb (not shown).

In certain exemplary embodiments, the microporous membrane 10 may be provided with any one of the following: solid ribs, discrete broken ribs, continuous ribs, discontinuous ribs, angled ribs, linear ribs, longitudinal ribs extending substantially in a machine direction of said porous membrane, lateral ribs extending substantially in a cross-machine direction of said porous membrane, transverse ribs extending substantially in said cross-machine direction of the separator, cross mini-ribs, serrations or serrated ribs, battlements or battlemented ribs, curved or sinusoidal ribs, disposed in a solid or broken zig-zag-like fashion, grooves, channels, textured areas, embossments, dimples, nubs, porous, non-porous, mini ribs, cross-mini ribs, and combinations thereof.

Figure 4:
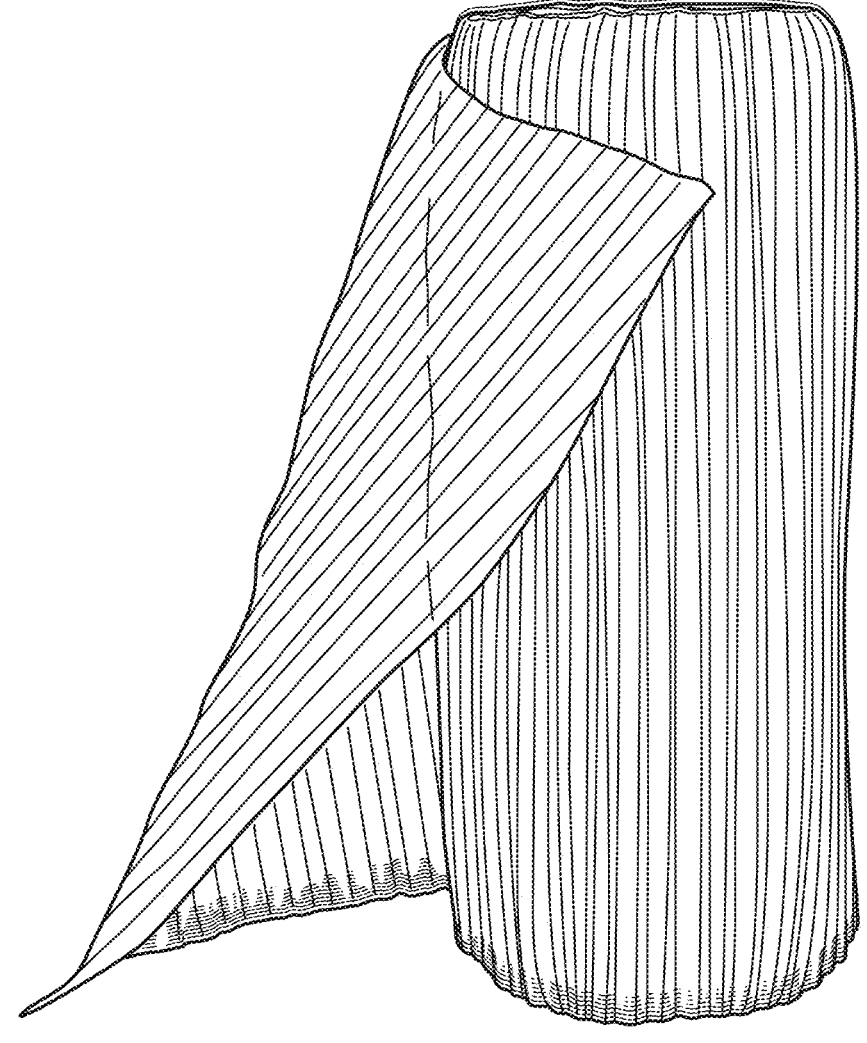
FIGS. 4 and 5 illustrate an existing rain screen article.
Figure 5:
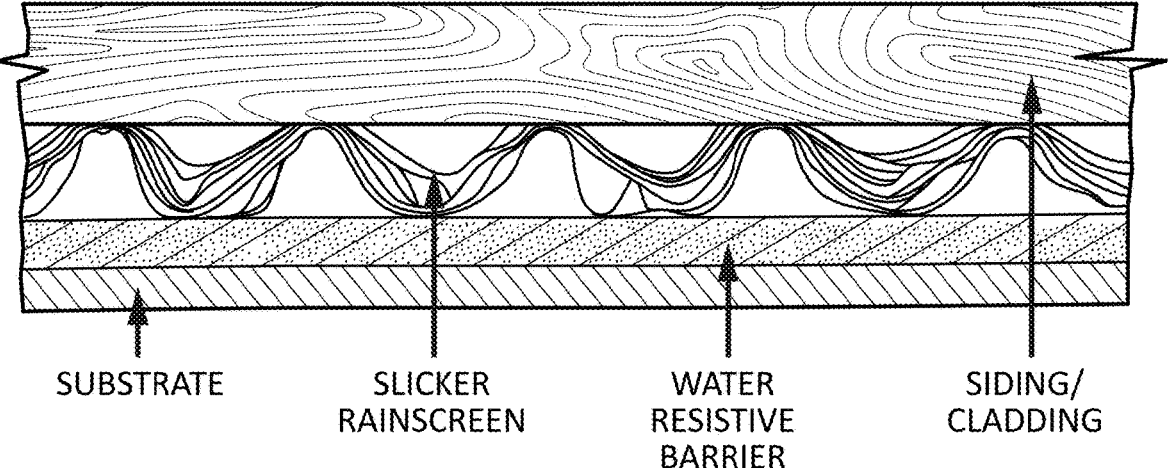

With continued reference to FIG. 7, the ribs 104 may be formed by a variety of methods, including by extrusion, co-extrusion, embossing (done, for example, at room temperature to about 50° C.), printing (screen-printing, intaglio-printing, etc.), patterning (etching for example), calendering (done, for example, at temperatures between about 100° C. to about 250° C.). The ribs 104 may be linear or non-linear ribs as shown in FIG. 4. The ribs 104 may have a height $T_{Rib}$ of from approximately 0.1 mm to approximately 12 mm, measured from the surface of the microporous membrane backweb 102 to the tip of the ribs 104. The ribs may be integral (like those formed by extrusion, co-extrusion, embossing, calendering, or etching) or non-integral (like those formed by printing).

The backweb thickness $T_{BW}$ of the microporous membrane 100 is not so limited and may be, for example, from approximately 50 μm to approximately 500 mm, from approximately 75 μm to approximately 300 mm, from approximately 100 μm to approximately 100 mm, from approximately 125 μm to approximately 50 mm, from approximately 150 μm to approximately 25 mm, from approximately 500 μm to approximately 10 mm, from approximately 50 μm to approximately 1.0 mm, from approximately 50 μm to approximately 850 μm, from approximately 50 μm to approximately 650 μm, from approximately 50 μm to approximately 450 μm, from approximately 50 μm to approximately 250 μm, or from approximately 50 μm to approximately 100 μm. Calendering the porous membrane may also impart integral features into the material, set the product height, and/or the like.

In some embodiments, the microporous membrane may be a self-adhesive microporous membrane, meaning that an adhesive is applied on at least a portion of a surface thereof. Self-adhesive microporous membrane may also mean that the membrane itself is adhesive without the addition of an adhesive to any surfaces thereof. For example, one or more surfaces of the membrane may be tacky such that if they are pressed against another surface a bond between the two surfaces results. The adhesive may be applied in discrete areas on at least a portion of a surface of the membrane, or the adhesive may cover an entire surface of the microporous membrane. In preferred embodiments, the adhesive is a water vapor permeable adhesives known in the art, such as those disclosed in U.S. Patent App. Pub. No. 2016/0024782, which is incorporated herein by reference. The self-adhesive microporous membrane may have a removable liner covering the adhesive. Self-adhesive may mean that a material itself is adhesive or that an adhesive has been added to one or more surfaces of a material to make it adhesive.

Figure 8A:
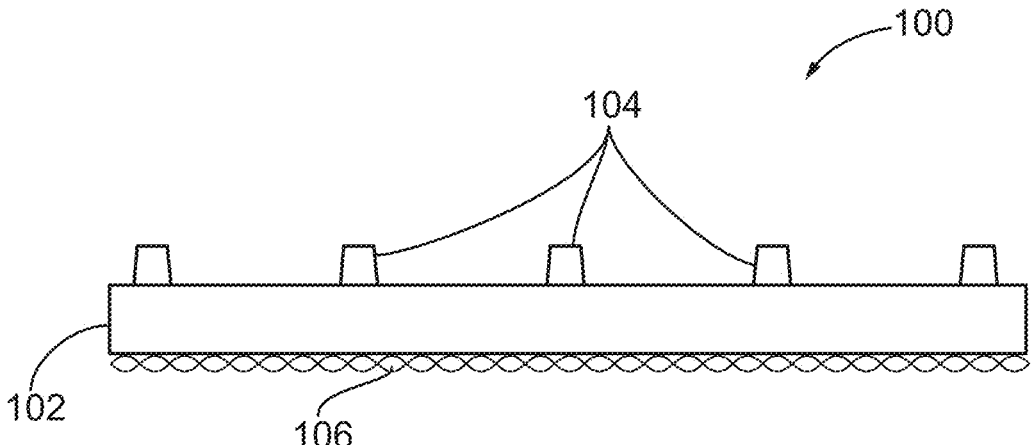
FIGS. 8A and 8B are schematics of an inventive embodiment with a scrim.
Figure 8B:
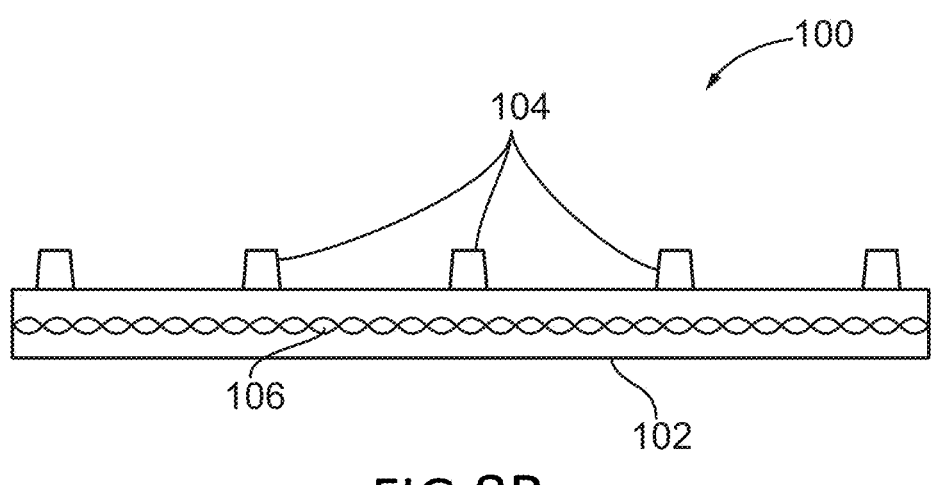

With reference to FIGS. 8A and 8B, certain select embodiments 100 may be provided as a multilayer structure having a scrim or scrim material component or layer 106. As used herein, "scrim" may be defined by its known definition or as a fibrous mat or material, a reinforcing layer or material, and/or the like, and/or combinations thereof. The scrim or scrim material 106 may be added to the porous membrane 102 in order to improve the mechanical properties and characteristics, such as the tensile strength, tear strength, shear strength, and/or the like, and/or combinations thereof.

Certain embodiments may provide the scrim 106 as a glass mat, polyester fleece, polymer mesh or netting, and/or the like, and combinations thereof. Such examples of scrim material may be a cross laminated polyolefin open mesh nonwoven or co-extruded cross laminated strands, such as CLAF® fabric and CLAF® mesh manufactured and sold by JX Nippon ANCI Corporation of Tokyo, Japan. Another example of scrim material may be Colback® manufactured and sold by Low & Bonar PLC of London, United Kingdom. Additional exemplary embodiments of the scrim or scrim material may further include heat bondable extruded netting, such as that manufactured by SWM of Alpharetta, Georgia; and heat bondable spun bond or meltblown (or composite spunbond-meltblown-spunbond ("SMS")) nonwoven material.

With reference to the multilayer structure 100 in FIG. 8A, the scrim 106 may be added to the porous membrane 102 as a layer via heat bonding during any feasible step in the manufacturing process. One such method may heat bond the scrim 106 to the porous membrane after extruding the processing oil (extraction of the processing oil is described hereinafter). As shown in FIG. 8A, the scrim may be bonded to a side opposite the ribs 104 or bonded to the side having ribs 104 thereon. With reference to FIG. 8B, another exemplary method may provide the scrim 106 by incorporating it in the porous membrane 102 during the extrusion process (the extrusion process is described hereinafter). In some embodiments of the multilayer structure 100 as shown in FIG. 8B, the scrim 106 may be incorporated approximately in the middle of the porous membrane 102. In other embodiments, the scrim may be incorporated closer to the side of the porous membrane having ribs 104 or incorporated closer to the side opposite to the side of the porous membrane having ribs. Calendering the porous membrane and scrim assembly may also impart integral features into the material, set the product height, and/or the like.

Composition

The possibly preferred microporous membrane described herein may be or contain at least one of a thermoplastic polymer, at least one filler, at least one processing oil, and optionally, one or more additional components to provide different properties such as flame retardance. These components are described in further detail herein and herein below.

Thermoplastic Polymer of the Microporous Membrane

The at least one thermoplastic polymer is not so limited and may be a variety of thermoplastic polymers not inconsistent with the stated goals herein. For example, the thermoplastic polymer may be or contain an acid resistant thermoplastic polymer or a thermoplastic polymer that is not acid resistant. Some preferred thermoplastic polymers are polyvinyl chloride, a phenolic resin, polyethylene and polypropylene, polyethylene of high molecular weight (e.g., high or ultrahigh molecular weight polyethylene), polyethylene of low molecular weight (e.g., low or ultralow molecular weight polyethylene), or mixtures thereof. In some embodiments, a high or ultrahigh molecular weight polyethylene (HMWPE or UHMWPE) alone, or mixtures of HMWPE and/or UHMWPE with low molecular weight polyethylene (LMWPE) or an ultralow molecular weight polyethylene (ULMWPE) are particularly preferred for use as the thermoplastic polymer, or another molecular weight polyethylene may be used.

High molecular weight polyethylene (HMWPE) is a polyethylene polymer having a weight average molecular weight of from least approximately $1 \times 10^5$ to less than approximately $1 \times 10^6$. Ultrahigh molecular weight polyethylene (UHMWPE) is a polyethylene polymer having a weight average molecular weight of approximately $1 \times 10^6$ or greater, preferably in some embodiments, between approximately $1 \times 10^6$ and approximately $15 \times 10^6$, between approximately $3 \times 10^6$ and approximately $10 \times 10^6$, or between approximately $5 \times 10^6$ and approximately $9 \times 10^6$. The content of the HMWPE and/or UHMWPE is approximately 1 wt. % or more, preferably in some embodiments between approximately 10 wt. % to approximately 90 wt. % based on the total weight of the thermoplastic polymer, and preferably in other embodiments between approximately 10 wt. % to approximately 70 wt. %.

In embodiments where a low molecular weight polyethylene and/or an ultralow molecular weight polyethylene are used, the amount of the low or ultralow molecular weight polyethylene can be present in an amount from approximately 0.1 wt. % to approximately 20 wt. %, from approximately 0.5 wt. % to approximately 15 wt. %, from approximately 1.0 wt. % to approximately 10 wt. %, or from approximately 1.0 wt. % to approximately 5 wt. % based on the total weight of the at least one thermoplastic resin. Ultra-low molecular weight polyethylene has a weight average molecular weight ranging from of approximately 100 k to approximately 150 k (e.g., approximately 100 k to approximately 125 k). An ultra-low molecular weight polyolefin may have a molecular weight less than approximately 100 k.

In some embodiments, the thermoplastic polymer may be recycled to improve environmental friendliness of the product. The amount of recycled material used may be adjusted so as to not be a detriment the performance of the product.

In some embodiments, the membrane and the scrim may be the same thermoplastic polymer (such as both being PE or PP) and may be recycled together to improve environmental friendliness of the product.

In some embodiments, the membrane and the scrim may both be polyolefins and may be the same or different thermoplastic polymer (such as both being PE or PP, or one being PE and the other being PP) and may be recycled separately or together to improve environmental friendliness of the product. A PE membrane and a PP scrim is just one example.

Filler of the Microporous Membrane

The filler of the microporous membrane is not so limited, and may be a variety of inorganic or organic filler not inconsistent with the state goals herein, which include reducing costs while still providing a microporous membrane having the properties described herein. The inorganic and/or organic filler may include spherical or irregular particles, flakes, pellets, or agglomerates of material. The amount of filler in the microporous membrane may be from about 5 wt. % to about 65 wt. %, from about 5 wt. % to about 60 wt. %, from about 10 wt. % to about 50 wt. %, from about 15 wt. % to about 40 wt. %, from about 20 wt. % to about 30 wt. %, or from about 25 wt. % to about 30 wt. % based on the total weight of the membrane.

In some preferred embodiments, the filler may be or contain at least one inorganic or organic filler made of or containing a material that is more hydrophobic or has a lower surface wettability with water (when uncoated and untreated) than silica does (when uncoated or untreated). And in some preferred embodiments, the at least one inorganic or organic filler has a lower surface wettability with water (when uncoated and untreated) than polyethylene does (when uncoated or untreated). In some preferred embodiments, the filler may be or contain at least one inorganic or organic filler made of or containing a material that has a low surface wettability with water, i.e., has exhibits a contact angle greater than or equal to about 90°, greater than about 90°, greater than about 100°, greater than about 120°, greater than about 130°, greater than about 140°, greater than about 150°, greater than about 160°, or greater than about 170°, but in all cases less than about 180°. The surface wettability with water (i.e., contact angle) may be measured according to ASTM D7334-08(2013) or equivalents. In some embodiments, the at least one organic or inorganic filler is non-wetting. The organic or inorganic filler may or may not be subjected to a surface treatment or surface coating to obtain the desired wettability or hydrophobicity.

Non-limiting examples of materials that can be used as the filler include the following: carbon black, talc, calcium carbonate, kaolin, diatomaceous earth, clay, wollastonite, mica, aluminum oxide ($Al_2O_3$), boehmite ($Al(O)OH$), zirconium dioxide ($ZrO_2$), titanium dioxide ($TiO_2$), barium sulfate ($BaSO_4$), barium titanium oxide ($BaTiO_3$), aluminum nitride, silicon nitride, calcium fluoride, barium fluoride, zeolite, apatite, mullite, spinel, olivine, mica, tin dioxide ($SnO_2$), indium tin oxide, oxides of transition metals, and mixtures thereof.

In some embodiments, silica can be included as one of the fillers. In some preferred embodiments, when silica is included as one of the at least one inorganic filler and organic filler, it may be included in addition to at least one of the following: carbon black, talc, calcium carbonate, kaolin, diatomaceous earth, clay, wollastonite, mica, aluminum oxide ($Al_2O_3$), boehmite (Al(O)OH), zirconium dioxide ($ZrO_2$), titanium dioxide ($TiO_2$), barium sulfate ($BaSO_4$), barium titanium oxide ($BaTiO_3$), aluminum nitride, silicon nitride, calcium fluoride, barium fluoride, zeolite, apatite, mullite, spinel, olivine, mica, tin dioxide ($SnO_2$), indium tin oxide, oxides of transition metals, and mixtures thereof. In some preferred embodiments, silica (or some equally hydrophilic filler, (e.g., a filler with a contact angle of about 96° or more when uncoated and untreated)) is added as one of the fillers in addition to one or more other inorganic or organic fillers that are more hydrophobic or have a lower surface wettability with water than silica (or the alternative). The additional one or more inorganic filler or organic filler may be subjected to a surface treatment or coating to increase its hydrophobicity or decrease its surface wettability. In this case, the additional one or more surface treated or coated inorganic or organic filler should be more hydrophobic or have a lower surface wettability with water than silica. In some embodiments, the at additional one or more inorganic filler or organic filler (with or without being surface treated or coated) has a surface wettability with water such that the wetting angle is 90° or more, 100° or more, 120° or more, 130° or more, 140° or more, 150° or more, 160° or more, or 170° or more. In some embodiments, the additional one or more inorganic filler or organic filler is non-wettable or has a wetting angle of 180°.

In some preferred embodiments, the at least one organic or inorganic filler that is more hydrophobic, or has a lower surface wettability with water than silica, is present in an amount of from approximately 5 wt. % to approximately 30 wt. % (but may be present up to 60 wt. %) with respect to the total weight of the microporous membrane. In some embodiments, the at least one organic or inorganic filler that is more hydrophobic or has a lower surface wettability with water than silica is carbon black.

Processing Oil

The processing oil (or plasticizer) is not so limited. Without wishing to be bound by theory, it is believed that the processing oil improves the manufacturing processability of the thermoplastic polymer (e.g., UHMWPE), and is used to create, at least in part, the microporous structure of the membrane when it is removed or extracted during the manufacturing process. The processing oil, in some embodiments, has little solvating effect on the thermoplastic polymer at 60° C., only a moderate solvating effect at elevated temperatures on the order of about 100° C., and a significant solvating effect at elevated temperatures on the order of about 200° C. Suitable processing oils are, in some embodiments, a liquid at room temperature and include those meeting the requirements of ASTM D 2226-82, Types 103 and 104 or equivalents. Preferred in some embodiments are those oils which have a pour point of less than 22° C. according to ASTM D 97-66 (reapproved 1978) or equivalents. Particularly preferred are oils having a pour point of less than 10° C. In some preferred embodiments, the processing oil may be, for example, any one of the following: mineral oil, olefinic oil, paraffinic oil, naphthenic oil, aromatic oil, or mixtures thereof. Also see U.S. Pat. Nos. 3,351,495 and 4,861,644, incorporated herein by reference, for additional processing oil (or plasticizer) suggestions.

In some embodiments, the amount of processing oil in the microporous membrane is, for example, from about 0.1 wt. % to about 40 wt. %, from about 0.1 wt. % to about 35 wt. %, from about 0.1 wt. % to about 20 wt. %, from about 1 wt. % to about 10 wt. %, or from about 1 wt. % to about 5 wt. % with respect to the weight of the microporous membrane.

In some preferred embodiments, the amount of processing oil is as close to zero as possible because the presence of processing oil may increase flammability. However, due to costs restraints, sometimes processing oil remains in the amounts disclosed herein, and flammability issues may be addressed by the addition of flame retardants as part of the microporous membrane itself or as part of a coating applied to one or more sides of the microporous membrane.

Optional One or More Additional Components

One or more additional components may be added and are not so limited. They may include a variety of additional components that impart desirable properties to the microporous film. Examples of desirable properties include: flame retardance, reflectivity, friction, UV resistance, etc. A flame retardant may be added for flame retardance and the flame retardant may be a halogenated or non-halogenated flame retardant. Preferred flame retardants are any that are stable above 180° C. A UV absorbent may be added for UV resistance, including benzotriazoles, benzophenones, carbon black, and titanium dioxide. Metal particles may be added for increased reflectivity. Adding additional fillers may increase surface friction of the microporous membrane. At least certain flashing embodiments may include colorants and may be provided in several colors (such as gray, black, brown, or white [may add TiO2]), may have a metal look or metal coating, and/or may be paintable on at least one side and/or edge.

In some embodiments, one or more additional components may be added to the microporous membrane itself for a particular purpose, and in addition to this, a coating or treatment may be provide on one or more surfaces of the microporous membrane to achieve this purpose. For example a flame retardant may be included as part of the microporous membrane and/or may be applied to one or more surfaces of the microporous membrane as a coating.

The amount of the one or more additional components is not so limited and may be present in a variety of ranges from about 0.1 wt. % to about 15 wt. %, about 0.5 wt. % to about 10 wt. %, or about 1.0 wt. % to about 5.0 wt. % based on the total weight of the microporous membrane.

Fire Retardant

In some embodiments, the microporous membrane may be subjected to one or more surface treatments or have one or more coatings provided thereon.

In some preferred embodiments, a flame or fire retardant may be added to the microporous membrane itself.

In some preferred embodiments, a coating may be provided to impart flame retardance to the microporous membrane may be applied to the microporous membrane in addition to or instead of adding a flame or fire retardant compound to the microporous membrane itself. For example, a coating may be a flame retardant applied to one or more surfaces of the microporous membrane. The flame retardant may be, for example, magnesium hydroxide, mono and diammonium phosphate, ammonium bromide, ammonium chloride, boric acid, borax, ammonium borate, ethanolammonium borate, phosphate or sulfamate, ammonium sulfamate, organic phosphate esters, or halogenated organic compounds like decabromodiphenyl oxide, chlorinated or brominated paraffin, chlorinated or brominated binders, thiourea, hydrated alumina, graphite, antimony oxides, and/or the like, and combinations thereof. Application methods include those known in the art, such as padding, gravure coating, foam coating, slot coating, printing, spraying, paste coating, powder application, kiss coating, and screen coating. The flame retardant may be added to the coating composition alone, or in combination with other components such as lubricants, binders, antimicrobials, color, water and oil repellents, surfactants, and other chemical auxiliaries known to the art. Following the application, the coating may be dried.

In some preferred embodiments, the microporous membrane with or without the flame retardant coating may be class A fire rated, having passed the ASTM E-84 requirements or equivalents.

Products Comprising the Microporous Membrane

Any inventive microporous membrane described herein can be incorporated into any product for any application where the microporous membrane might be useful. Microporous membranes described herein would be particularly useful for products and/or applications where passage of water vapor across the membrane is desirable, but passage of liquid water is not. A few applications envisioned by the inventors of this application include the following: use in roofing underlayment, use in drainable and non-drainable building wrap, use in flashing, use in rain screens, use in insulation material, and use in sound proofing material.

When used in or as a roofing underlayment, the roofing underlayment may include any microporous membrane described herein. The roofing underlayment may include layers in addition to the microporous membrane disclosed herein to improve, for example, the reflectivity, UV resistance, or slip resistance of the roofing underlayment. In some embodiments, the microporous membrane itself may be modified to impart reflectivity, UV resistance, and/or slip resistance (e.g., by adding UV absorbers to the mixture used to form the microporous membrane itself).

Figure 9:
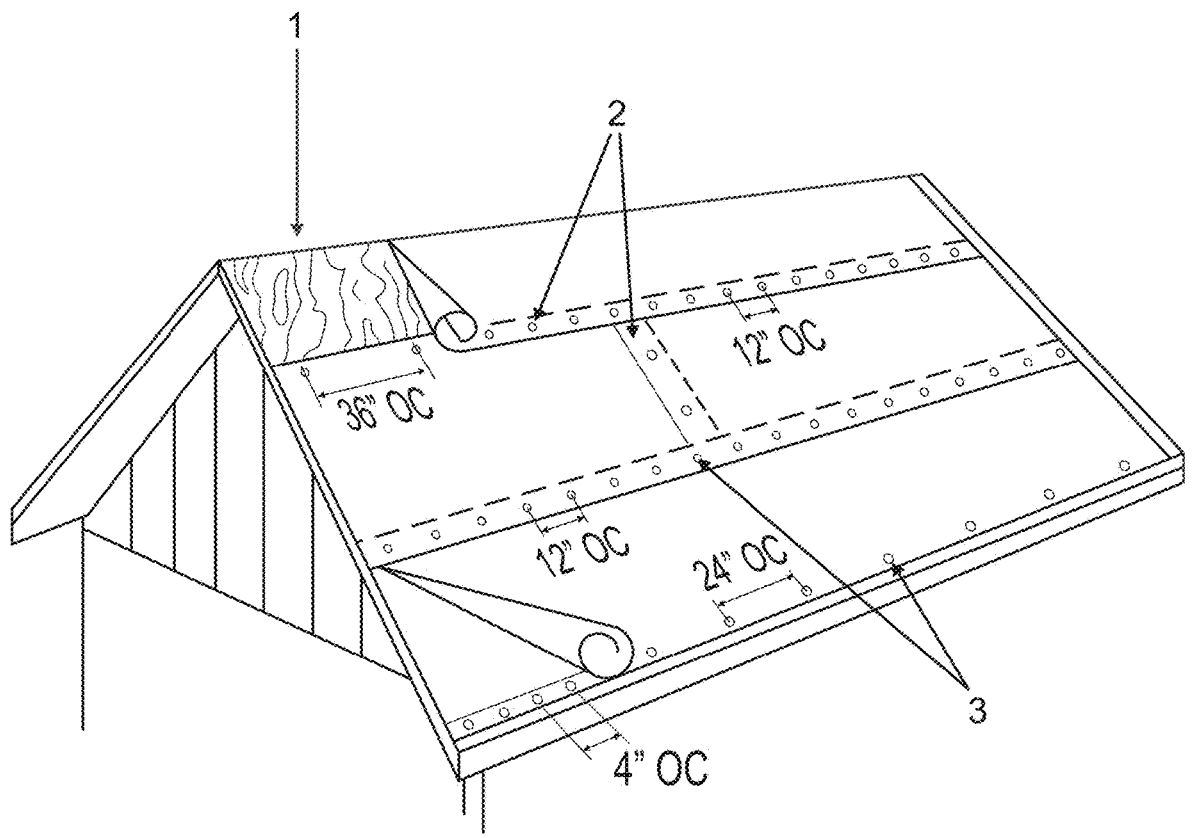
FIG. 9 shows a roofing underlayment system.
Figure 10:
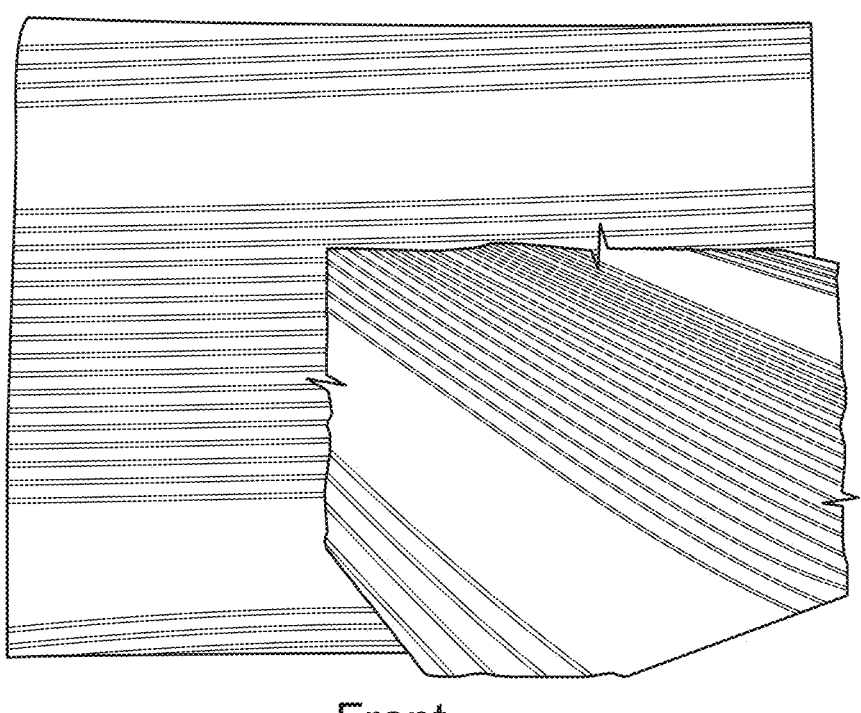
FIG. 10 shows a front and back view of an exemplary ribbed microporous membrane including at least one scrim component as described herein.
Figure 10:
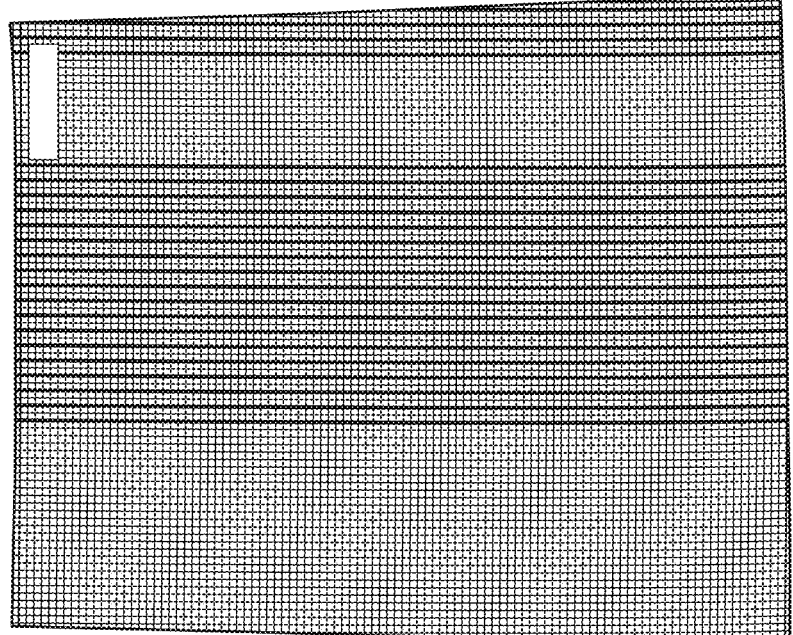
Figure 11:
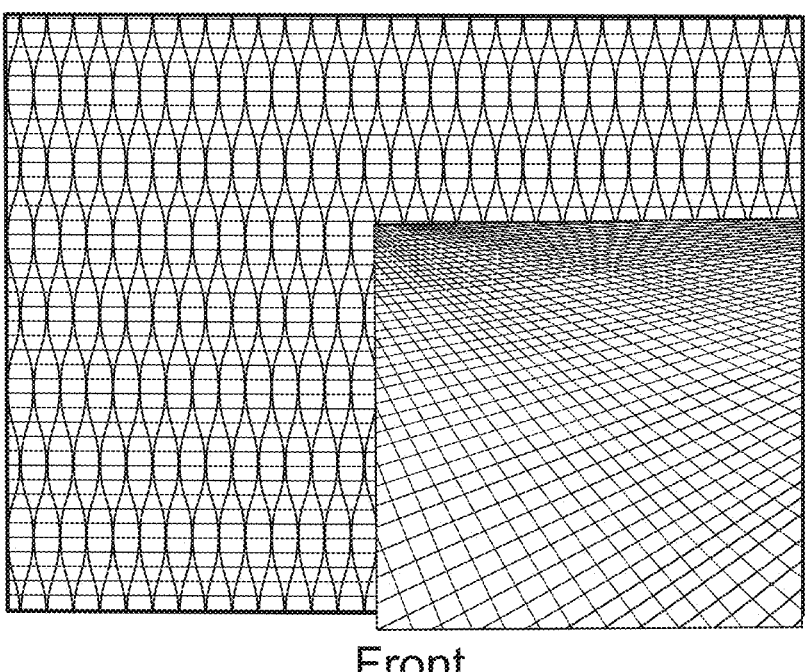
FIG. 11 shows a front and back view of an exemplary ribbed microporous membrane including at least one scrim component as described herein.
Figure 11:
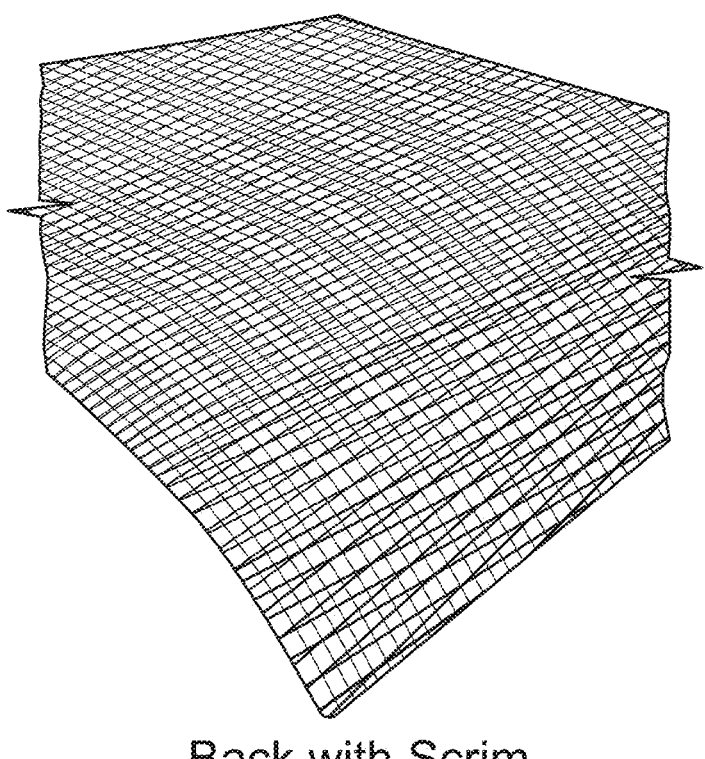
Figure 12:
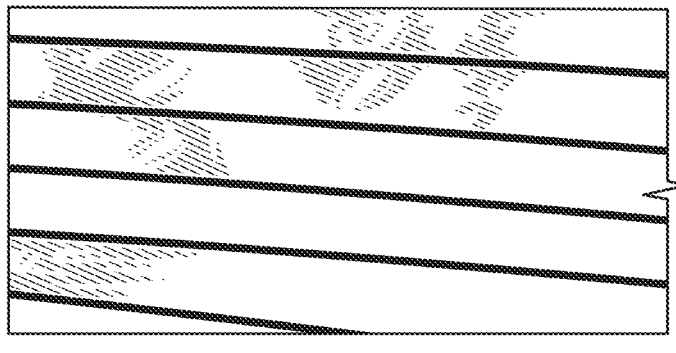
FIG. 12 shows a front and back view of an exemplary ribbed microporous membrane as described herein that does not include a scrim component. This membrane was stretched during production.
Figure 12:
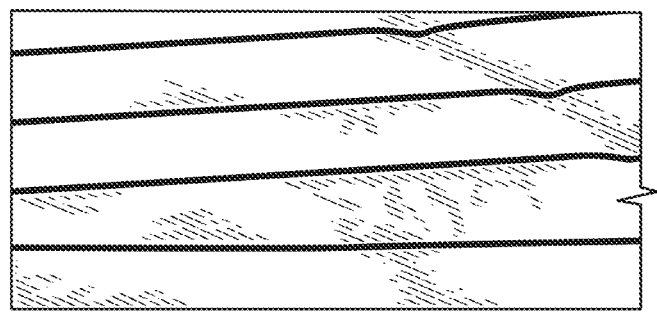

A roofing underlayment system is not so limited and may essentially be any roofing underlayment as generally described herein attached or mounted to a roof deck. The roof deck may be made of any material, including plywood, particle board, brick, stone, plastic, or other materials. The roofing underlayment may be attached or mounted to the roof deck using any means, including adhesives, and/or mechanical fasteners (e.g., nails, screws, staples, etc.). FIG. 9 shows an exemplary roofing underlayment system including a roof deck 1, a roofing underlayment including any microporous membrane described herein 2, and a fastening or attachment means 3.

When used in or as a building wrap, the building wrap may include essentially any microporous membrane as generally described herein. The house wrap may be a drainable or non-drainable building wrap. In some preferred embodiments, the building wrap is a drainable building wrap and has a drainage efficiency of at least approximately 50%, at least approximately 60%, at least approximately 70%, at least approximately 80%, or at least approximately 90% when tested according to ASTM E2273 or equivalents.

A building wrap system is not so limited and may include any building wrap as generally described herein attached or mounted to exterior wall sheathing. In some preferred embodiments, the exterior wall sheathing may be made of stone, brick, plastic, plywood, or wood. The building wrap may be attached or mounted to the wall sheathing by a variety of means such as with adhesives, and/or mechanical fasteners (e.g., nails, screws, staples, etc.). In some embodiments, the building wrap itself, i.e., without the addition of an adhesive to one or more surfaces thereof, may be adhered to an exterior wall sheathing made of stone, brick, plastic, plywood, etc. For example, the building wrap may be tacky such that when pressure is applied thereto it may be attached to an exterior wall sheathing.

When used in an insulating material, the insulating material may include essentially any microporous membrane as generally described herein. An insulating system may include insulating material that includes any microporous membrane as generally described herein disposed between at least two wall studs, rafters, or joists of a building, or any other building cavity.

When used as a sound-proofing material, the sound-proofing material may include essentially any microporous membrane as generally described herein. The sound proofing material may be self-adhesive or non-self-adhesive. A sound proofing system may include a laminate wall or floor, wherein the laminate includes the sound proofing material. In some embodiments, at least one layer of a laminate floor or wall includes a microporous membrane as generally described herein as a sound proofing material.

When used as a rain screen, the rain screen may include essentially any microporous membrane described herein, wherein the microporous membrane may include positive ribs having a rib height from the surface of the microporous membrane to the tip of the rib of at least about 12 mm, at least about 10 mm, at least about 9 mm, at least about 8 mm, or at least about 7 mm. In preferred embodiments, the rain screen may include essentially any microporous membrane described herein with the appropriate rib height. The rain screen may be a self-adhesive or non-self-adhesive rain screen. When used in a rain screen system, the rain screen may be attached or mounted to an exterior wall sheathing, and in some embodiments, wood or vinyl siding, brick, stone, or logs touching the ribs of the rain screen. In some embodiments, the rain screen is attached or mounted to the sheathing with adhesives, and/or mechanical fasteners (e.g., nails, screws, staples, etc.). The rain screen itself, i.e., without the addition of an adhesive to any surfaces thereof, may be self-adhesive and attached to exterior wall sheathing, and in some embodiments, wood or vinyl siding, brick, stone, or logs. For example, the rain screen itself may be tacky in some embodiments, such that if pressure is applied the rain screen becomes attached to exterior wall sheathing, and in some embodiments, wood or vinyl siding, brick, stone, or logs.

In an exemplary preferred embodiment, the rain screen will include a microporous membrane as generally disclosed herein (with or without an adhesive to make it self-adhesive). The rain screen will not need to be used in combination with a water resistive barrier because it will, itself, provide excellent water resistance.

When used as a flashing or weatherproofing, the flashing may include any microporous membrane as generally described herein. The flashing may include layers in addition to the microporous membrane disclosed herein to improve, for example, the reflectivity, UV resistance, or slip resistance of the flashing. In some embodiments, the microporous membrane itself may be modified to impart reflectivity, UV resistance, and/or slip resistance (e.g., by adding UV absorbers to the mixture used to form the microporous membrane itself). At least certain flashing embodiments may be provided in several colors (such as gray, black, brown, or white [may add colorants such as $TiO_2$]), may have a metal look or metal coating, and/or may be paintable on at least one side and/or edge.

A flashing or weatherproofing system is not so limited and may include any flashing as generally described herein. The flashing may be attached to or mounted on any variety of roofing or building joints, such as at chimneys, vent pipes, walls, windows and door openings. The flashing may be attached or mounted to the joints by such means as adhesives, and/or mechanical fasteners (e.g., nails, screws, staples, etc.). The flashing itself, i.e., without the addition of an adhesive, may, in some be adhered to any variety of roofing or building joints, such as at chimneys, vent pipes, walls, windows and door openings. For example, the flashing itself may be tacky in some embodiments, such that if pressure is applied the membrane may be adhered to a surface of any variety of roofing or building joints, such as at chimneys, vent pipes, walls, windows and door openings.

Method for Making a Microporous Membrane

The method described herein can be used to make any one of the microporous membranes disclosed herein. The steps of the method are not so limited. In some preferred embodiments, the method may include extruding a mixture having at least one thermoplastic polymer, at least one filler, and at least one processing oil to form a microporous membrane precursor. The thermoplastic polymers, fillers, and processing oils in the extruded mixture and the resulting microporous membrane precursor are as described herein. The amount of processing oil in the extruded mixture (extrudate) and the resulting microporous membrane precursor is generally higher than that in the final microporous membrane. For example, the amount of processing oil in the extrudate and the resulting microporous membrane precursor is, for example from about 50 wt. % to about 90 wt. %, from about 60 wt. % to about 80 wt. %, or from about 65 wt. % to about 75 wt. % based on the total weight of the mixture of the microporous membrane precursor.

In some preferred embodiments, in a subsequent step, up to 99.99% of the processing oil is extracted from the precursor membrane using a solvent so that remaining processing oil in the microporous membrane is from about 0.1 wt. % to about 35 wt. % based on the total weight of the microporous membrane, but may be as low as zero (0) wt. %. In some embodiments, the solvent includes an oil or is an oil.

In some preferred embodiment, a colorant may be added to change the color of the final membrane product. For example, $TiO_2$ may be added as a white colorant.

In some preferred embodiments, a step of forming a rib or ribs on one or both sides of the microporous membrane precursor is performed. The ribs may have a height (positive) or depth (negative) of from approximately 0.1 mm to approximately 110 mm, measured from the surface of the microporous membrane to the tips or bottoms of the ribs. The ribs may be a uniform set, an alternating set, or a mix or combination of solid, discrete broken ribs, continuous, discontinuous, angled, linear, longitudinal ribs extending substantially in a machine direction of the membrane, lateral ribs extending substantially in a cross-machine direction of the membrane, transverse ribs extending substantially in a cross-machine direction of the membrane, cross ribs extending substantially in a cross-machine direction of the membrane, serrations or serrated ribs, battlements or battlemented ribs, curved or sinusoidal, disposed in a solid or broken zig-zag-like fashion, grooves, channels, textured areas, embossments, dimples, porous, non-porous, mini ribs or cross-mini ribs, and/or the like, and combinations thereof. An exemplary pattern may include the Daramic® RipTide™ acid-mixing rib profile as intended for use in a lead acid battery separator. The ribs may be formed by any method. Exemplary methods include patterning, printing, embossing, or calendering. In some embodiments calendering and embossing are preferred because integral ribs are formed. Integral ribs are, generally, more sturdy than non-integral ribs. This may depend on the size of the ribs (width or height). Patterned or printed ribs are non-integral because they are applied to rather than being part of the microporous membrane, such as by additive manufacturing.

The provision of integrated ribs provides a variety of benefits (non-slip, walkability, etc.) without the requirement of adding an additional layer for this purpose. For example, addition of a non-slip layer or printing of ribs on the surface is avoided.

In some embodiments, the microporous precursor membrane may be stretched in the machine direction (MD), in the transverse direction (TD), or in both the MD and TD. In embodiments where the precursor membrane is stretched in the MD and TD, these stretching steps may be performed sequentially or simultaneously. Stretching in the MD and TD may result in, at least for example, a longer or wider film. In some embodiments, the microporous membrane may be stretched after the formation of ribs. In some embodiments, no stretching step is performed on the microporous precursor membrane at any time, including before or after the formation of ribs in the microporous precursor membrane.

In some embodiments, the membrane may be printed on or embossed to add logos or other characters thereto.

In some embodiments, the final membrane product may have a width of from 0.1 to 10 meters, 0.5 to 5 meters, 1 to 5 meters, 1.5 to 5 meters, 1 to 4 meters, 1 to 3 meters, or 1 to 2 meters.

In some preferred embodiments, the final membrane may have a width as described above and a total thickness (including ribs if any on one or both sides) of between 0.05 to 5 mm, from 0.10 to 3 mm, from 0.10 to 2 mm, from 0.2 to 2 mm, from 0.3 to 2 mm, from 0.4 to 2 mm, from 0.5 to 2 mm, from 0.6 to 2 mm, from 0.7 to 2 mm, from 0.8 to 2 mm, from 0.9 to 2 mm, or from 1 to 2 mm.

For utilization as a roofing underlayment, a preferred thickness range for the membrane may be 0.200 to 0.600 mm and a preferred width for the membrane may be 1 to 1.5 m. For utilization as flashing, a preferred thickness for the membrane may be 0.70 to 1.75 mm and a preferred width may be from 0.150 to 0.250 meters. For utilization as house wrap, a preferred thickness for the membrane may be 0.100 to 0.200 mm and a preferred width may be from 1 to 3 meters. For utilization as a flooring underlayment, a preferred thickness may be from 1 to 3 mm and a preferred width may be from 0.3 to 1.5 meters.

Some benefits include the ability to combine the functionality of multiple layers into one microporous membrane that has breathability, is able to hold water, and has one or more non-slip surfaces (when integral ribs are provided on one or both sides of the membrane). Combining the functionality of multiple layers into 1 or sometimes 2 or 3 (if a scrim component is added to one or both sides of the membrane) is achieved. Other products have separate layers for durability, non-slip, breathability, and water hold out. The material herein includes 2 or 3 layers—1 or 2 scrims for durability and the membrane which provides non-slip, breathability, and water hold out.

Some non-limiting Examples are included below.

EXAMPLES

Three exemplary microporous membranes including at least one thermoplastic polymer, at least one filler, and at least one processing oil were prepared. Some properties of these three exemplary microporous membranes are included in table 1, below:

TABLE 1

| Sample | Processing oil content (%) | permeance (perm) | water vapor transmission (g/m²/24 hour) |
|---|---|---|---|
| Sample #1 | 16 | 43 | 529 |
| Sample #2 | 27 | 30 | 370 |
| Sample #3 | 7 | 41 | 500 |

Samples were also found to have excellent UV exposure characteristics. UV exposure testing was done in Arizona and it was confirmed that 12 weeks exposure showed no degradation in material properties.

In accordance with at least selected embodiments, this application or invention may address the above needs, problems or issues, and/or may provide new and/or improved materials for use in building wraps, rain screens, roofing underlayments, sound proofing materials, flashing, insulation materials, and/or the like, and/or is directed to new or improved microporous membranes, products using the same, and methods for making and using the same, new microporous membranes having high water vapor transmission through the membrane, while simultaneously having high liquid water penetration resistance, and/or new microporous membranes having use as or are adapted for applications, including in the construction industry as a roofing, roofing material, roofing underlayment, building wrap, rain screen, flashing, sound proofing material, insulation material, and/or the like.

In at least one embodiment, a microporous membrane having a moderate to high water vapor permeability and high liquid water penetration resistance is disclosed. The microporous membrane may be used in building applications, including as or as part of a building wrap, a rain screen, a roofing underlayment, a flashing, a sound proofing material, or an insulation material. The microporous membrane may include at least one thermoplastic polymer, at least one filler, and at least one processing oil. The microporous membrane may be flat or may have ribs. The microporous membrane may include at least one scrim component. A method for forming the microporous membrane is also disclosed.

In accordance with at least selected embodiments, aspects, or objects, this application or invention provides, and/or is directed to new or improved microporous membranes, products using the same, and/or methods for making and/or using the same. In accordance with at least certain embodiments, the new microporous membranes have high water vapor transmission through the membrane, while simultaneously having high liquid water penetration resistance. These new microporous membranes have many applications, including in the construction industry as a roofing, roofing material, roofing underlayment, roofing component, building wrap, building component, rain screen, flashing, flashing component, sound proofing material, insulation material, flooring, flooring underlayment, flooring component, carpet underlayment, carpet component, and/or the like. The microporous membrane may include at least one scrim component, coating, surface treatment, surface material, ribs, pattern, printing, embossment, adhesive, and/or the like.

In at least one embodiment, a microporous membrane having a moderate to high water vapor permeability and high liquid water penetration resistance is disclosed. The microporous membrane may be used in building applications, including as or as part of a building wrap, a rain screen, a roofing underlayment, a flashing, a sound proofing material, or an insulation material. The microporous membrane may include at least one thermoplastic polymer, at least one filler, and at least one processing oil. The microporous membrane may be flat or may have ribs. The microporous membrane may include at least one scrim component. A method for forming the microporous membrane is also disclosed.

In at least one embodiment, there is provided a microporous membrane having use as or adapted for applications, including in the construction industry such as a roofing, roofing material, roofing underlayment, building wrap, rain screen, flashing, sound proofing material, insulation material, and/or flashing provided in several colors (such as gray, black, brown, or white), having a metal look or metal coating, and/or being paintable on at least one side, the microporous membrane comprising:

a thermoplastic polymer;

optionally a filler, silica, plasticizer, oil, solvent, additive, agent, particles, fibers, and/or the like; and, wherein the microporous membrane exhibits, at least one of: hydrophobicity, a moderate to high water vapor transmission through the membrane, a high liquid water penetration resistance, and a water vapor permeance value from about 5 to about 60 perms.

In at least one embodiment, there is provided a microporous membrane having use as or adapted for applications, including in the construction industry such as a roofing, roofing material, roofing underlayment, roofing component, building wrap, building component, rain screen, flashing, flashing component, sound proofing material, insulation material, flooring, flooring underlayment, flooring component, carpet underlayment, carpet component, and/or flashing provided in several colors (such as gray, black, brown, or white), having a metal look or metal coating, and/or being paintable on at least one side, the microporous membrane comprising:

a thermoplastic polymer;

optionally, the microporous membrane is hydrophobic and/or may include at least one filler, plasticizer, solvent, additive, agent, particles, fibers, scrim component, coating, surface treatment, surface material, ribs, pattern, printing, embossment, adhesive, logo, and/or the like; and, wherein the microporous membrane exhibits, at least one of: a moderate to high water vapor transmission through the membrane, a high liquid water penetration resistance, and a water vapor permeance value from about 5 to about 60 perms.

The present invention may be embodied in other forms without departing from the spirit and the essential attributes thereof, and, accordingly, reference should be made to the appended claims, rather than to the foregoing specification, as indicating the scope of the invention. Disclosed are components that may be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that may be performed it is understood that each of these additional steps may be performed with any specific embodiment or combination of embodiments of the disclosed methods.

The foregoing written description of structures and methods has been presented for purposes of illustration only. Examples are used to disclose exemplary embodiments, including the best mode, and also to enable any person skilled in the art to practice the invention, including making and using any devices or systems and performing any incorporated methods. These examples are not intended to be exhaustive or to limit the invention to the precise steps and/or forms disclosed, and many modifications and variations are possible in light of the above teaching. Features described herein may be combined in any combination. Steps of a method described herein may be performed in any sequence that is physically possible. The patentable scope of the invention is defined by the appended claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The compositions and methods of the appended claims are not limited in scope by the specific compositions and methods described herein, which are intended as illustrations of a few aspects of the claims. Any compositions and methods that are functionally equivalent are intended to fall within the scope of the claims. Various modifications of the compositions and methods in addition to those shown and described herein are intended to fall within the scope of the appended claims. Further, while only certain representative compositions and method steps disclosed herein are specifically described, other combinations of the compositions and method steps also are intended to fall within the scope of the appended claims, even if not specifically recited. Thus, a combination of steps, elements, components, or constituents may be explicitly mentioned herein or less, however, other combinations of steps, elements, components, and constituents are included, even though not explicitly stated.

As used in the specification and the appended claims, the singular forms "a," "an," and "the" include plural referents unless the context clearly dictates otherwise. Ranges may be expressed herein as from "about" or "approximately" one particular value, and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint. "Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other additives, components, integers, or steps. The terms "consisting essentially of" and "consisting of" may be used in place of "comprising" and "including" to provide for more specific embodiments of the invention and are also disclosed. "Exemplary" or "for example" means "an example of" and is not intended to convey an indication of a preferred or ideal embodiment. Similarly, "such as" is not used in a restrictive sense, but for explanatory or exemplary purposes.

Other than where noted, all numbers expressing geometries, dimensions, and so forth used in the specification and claims are to be understood at the very least, and not as an attempt to limit the application of the doctrine of equivalents to the scope of the claims, to be construed in light of the number of significant digits and ordinary rounding approaches.

Unless defined otherwise, all technical and scientific terms used herein have the same meanings as commonly understood by one of skill in the art to which the disclosed invention belongs. Publications cited herein and the materials for which they are cited are specifically incorporated by reference.

Additionally, the invention illustratively disclosed herein suitably may be practiced in the absence of any element which is not specifically disclosed herein.

The invention claimed is:

1. A microporous membrane comprising:
   one singular, integral layer comprising:
      a thermoplastic polymer;
      at least one particulate filler;
      at least one extractable or removable processing oil, plasticizer and/or solvent; the microporous membrane having a total thickness, including ribs if any, of between 0.05 to 5 mm, and having a bulk water hold out as measured by AATCC-127 that is greater than 150 cm.

2. The microporous membrane of claim 1, wherein the bulk water hold out as measured by AA TCC-127 is greater than 200 cm.

3. The microporous membrane of claim 1, comprising integrated or nonintegrated ribs on one or both sides of the membrane, for providing slip-resistance.

4. The microporous membrane of claim 1, exhibiting low wettability with water as indicated by a contact angle with water that is greater than or equal to 90° and less than 180°.

5. The microporous membrane of claim 1, exhibiting a water vapor transmission of 370 $g/m^2/24$ hours or more.

6. The microporous membrane of claim 1, comprising metal particles for increasing reflectivity.

7. The microporous membrane of claim 1, wherein $TiO_2$ is added for making the membrane lighter or whiter.

8. A composite comprising the microporous membrane of claim 1 and at least one scrim component.

9. The composite of claim 8, wherein said scrim component is a layer bonded to the microporous membrane.

10. The composite of claim 8, wherein said scrim component is incorporated within the microporous membrane.

11. The composite of claim 8, wherein said scrim component comprises at least a spunbond component.

12. The composite of claim 8, wherein said scrim component comprises at least a meltblown component.

13. A building comprising at least one of a building wrap, a roofing underlayment, a rain screen, a flooring component, a sound proofing material, or an insulation material, wherein the at least one of the building wrap, the roofing underlayment, the rain screen, the flooring component, the sound proofing material, or the insulation material comprises the composite of claim 8.

14. A building comprising at least two of a building wrap, a roofing underlayment, a rain screen, a flooring component, a sound proofing material, or an insulation material, wherein the at least two of the building wrap, the roofing underlayment, the rain screen, the flooring component, the sound proofing material, or the insulation material comprises the composite of claim 8.

15. A building comprising at least one of a building wrap, a roofing underlayment, a rain screen, a flooring component, a sound proofing material, or an insulation material, wherein the at least one of the building wrap, the roofing underlayment, the rain screen, the flooring component, the sound proofing material, or the insulation material comprises the microporous membrane of claim 1.

16. A building comprising at least two of a building wrap, a roofing underlayment, a rain screen, a flooring component, a sound proofing material, or an insulation material, wherein the at least two of the building wrap, the roofing underlayment, the rain screen, the flooring component, the sound proofing material, or the insulation material comprises the microporous membrane of claim 1.

17. A composite comprising the microporous membrane of claim 1 and at least one scrim component, coating, surface treatment, surface material, ribs, pattern, printing, embossment, and/or adhesive.

18. A microporous membrane comprising:
one singular, integral layer comprising:
a thermoplastic polymer;
at least one particulate filler; and
at least one extractable or removable processing oil, plasticizer and/or solvent; the microporous membrane having a total thickness, including ribs if any, of between 0.05 to 5 mm, having a bulk water hold out as measured by AATCC-127 that is greater than 150 cm, and having one or more selected from integrated ribs, low wettability with water as indicated by a contact angle with water that is greater than or equal to 90° and less than 180°, and a water vapor transmission of 370 g/m$^2$/24 hours or more.

19. The microporous membrane of claim 18, having two or more of integrated ribs, low wettability with water as indicated by a contact angle with water that is greater than or equal to 90° and less than 180°, and a water vapor transmission of 370 g/m$^2$/24 hours or more.

20. The microporous membrane of claim 18 having all three of the following: integrated ribs, low wettability with water as indicated by a contact angle with water that is greater than or equal to 90° and less than 180°, and a water vapor transmission of 370 g/m$^2$/24 hours or more.

21. A composite comprising the microporous membrane of claim 18 and at least one scrim component.

22. A building comprising at least one of a building wrap, a roofing underlayment, a rain screen, a flooring component, a sound proofing material or an insulation material, wherein the at least one of the building wrap, the roofing underlayment, the rain screen, the flooring component, the sound proofing material, or the insulation material comprises the composite of claim 21.

23. A building comprising at least two of a building wrap, a roofing underlayment, a rain screen, a flooring component, a sound proofing material or an insulation material, wherein the at least two of the building wrap, the roofing underlayment, the rain screen, the flooring component, the sound proofing material, or the insulation material comprises the composite of claim 21.

24. A building comprising at least one of a building wrap, a roofing underlayment, a rain screen, a flooring component, a sound proofing material, or an insulation material, wherein the at least one of the building wrap, the roofing underlayment, the rain screen, the flooring component, the sound proofing material, or the insulation material comprises the microporous membrane of claim 18.

25. A building comprising at least two of a building wrap, a roofing underlayment, a rain screen, a flooring component, a sound proofing material, or an insulation material, wherein the at least two of the building wrap, the roofing underlayment, the rain screen, the flooring component, the sound proofing material, or the insulation material comprises the microporous membrane of claim 18.

26. A composite comprising the microporous membrane of claim 18 and at least one scrim component, coating, surface treatment, surface material, ribs, pattern, printing, embossment, and/or adhesive.

\* \* \* \* \*